US012537283B2

(12) United States Patent
Takahashi et al.

(10) Patent No.: US 12,537,283 B2
(45) Date of Patent: Jan. 27, 2026

(54) VEHICLE ANTENNA DEVICE AND IN-VEHICLE SYSTEM

(71) Applicant: AGC Inc., Tokyo (JP)

(72) Inventors: Tomohiro Takahashi, Tokyo (JP); Yuki Kishimoto, Tokyo (JP)

(73) Assignee: AGC INC., Tokyo (JP)

( * ) Notice: Subject to any disclaimer, the term of this patent is extended or adjusted under 35 U.S.C. 154(b) by 63 days.

(21) Appl. No.: 18/736,493

(22) Filed: Jun. 6, 2024

(65) Prior Publication Data

US 2024/0322418 A1 Sep. 26, 2024

Related U.S. Application Data

(63) Continuation of application No. PCT/JP2022/043050, filed on Nov. 21, 2022.

(30) Foreign Application Priority Data

Dec. 9, 2021 (JP) .................................. 2021-200199

(51) Int. Cl.
*H01Q 1/32* (2006.01)
*H01Q 1/12* (2006.01)
(Continued)

(52) U.S. Cl.
CPC ............ *H01Q 1/1271* (2013.01); *H01Q 1/325* (2013.01); *H01Q 1/50* (2013.01); *H01Q 1/52* (2013.01); *H01Q 9/0407* (2013.01); *B60J 1/001* (2013.01)

(58) Field of Classification Search
CPC .......... H01Q 1/32; H01Q 1/1271; H01Q 1/22; H01Q 1/3275; H01Q 1/48–52
See application file for complete search history.

(56) References Cited

U.S. PATENT DOCUMENTS 7,180,473 B2  2/2007 Horie et al.
10,211,509 B2 * 2/2019 Kagaya ................. H01Q 1/325
(Continued)

FOREIGN PATENT DOCUMENTS

JP  2007-174034 A  7/2007
JP  2020-136880 A  8/2020
(Continued)

OTHER PUBLICATIONS

International Searching Authority, "International Search Report," issued in connection with International Patent Application No. PCT/JP2022/043050, dated Feb. 14, 2023.
(Continued)

*Primary Examiner* — Hasan Islam
(74) *Attorney, Agent, or Firm* — Foley & Lardner LLP

(57) ABSTRACT

To suppress noise included in an antenna provided on a glass plate.
A vehicle antenna device comprising a glass plate for a vehicle,
a first antenna capable of receiving or transmitting radio waves of a first frequency band, provided on the glass plate, and
an electric circuit which attenuates a signal of a second frequency band including a frequency band higher than the first frequency band,
wherein the first antenna has a first feeding portion to be electrically connected to a signal line of a transmission line and a first element connected to the first feeding portion, and
the electric circuit is provided at least one of between the first feeding portion or the vicinity of the first feeding portion and a ground portion, and between the first feeding portion and the signal line.

19 Claims, 17 Drawing Sheets

(51) Int. Cl.
*H01Q 1/50* (2006.01)
*H01Q 1/52* (2006.01)
*H01Q 9/04* (2006.01)
*B60J 1/00* (2006.01)

(56) References Cited

U.S. PATENT DOCUMENTS

| | | |
|---|---|---|
| 10,608,318 B2 * | 3/2020 | Doi .................. H04B 1/082 |
| 10,637,124 B2 | 4/2020 | Nagata et al. |
| 11,303,007 B2 | 4/2022 | Hirabayashi et al. |
| 2022/0263219 A1 * | 8/2022 | Kong ................ B32B 17/10761 |

FOREIGN PATENT DOCUMENTS

| | | |
|---|---|---|
| WO | WO-2018/079415 A1 | 5/2018 |
| WO | WO-2019/181623 A1 | 9/2019 |

OTHER PUBLICATIONS

International Searching Authority, "Written Opinion," issued in connection with International Patent Application No. PCT/JP2022/043050, dated Feb. 14, 2023.

* cited by examiner

VEHICLE ANTENNA DEVICE AND IN-VEHICLE SYSTEM

This application is a continuation of PCT Application No. PCT/JP2022/043050, filed on Nov. 21, 2022, which is based upon and claims the benefit of priority from Japanese Patent Application No. 2021-200199 filed on Dec. 9, 2021. The contents of those applications are incorporated herein by reference in their entireties.

TECHNICAL FIELD

The present disclosure relates to a vehicle antenna device and an in-vehicle system.

BACKGROUND ART

In recent years, it is not unusual that a variety of electronic devices, such as visible light cameras, radars, and sensors, are provided on or in the vicinity of a window glass of a vehicle. In some vehicles, an antenna pattern for receiving broadcast waves is disposed on the window glass of a vehicle such as a windshield. However, if an electronic device and an antenna pattern are placed proximate to each other so as not to block the view through the window glass too much, some problems may arise, such that the operation of the antenna becomes unstable and the antenna gain is lowered.

Thus, the following technology is known such that a noise removing pattern is provided between an electronic device and an antenna so as to absorb noise coming from the electronic device to the antenna and to reduce the noise reaching the antenna (see Patent Document 1, for example). The following technology is also known such that a canceling element is provided between an electronic device and an antenna so as to reduce noise coming from the electronic device to the antenna (see Patent Document 2, for example).

PRIOR ART DOCUMENTS

Patent Documents

Patent Document 1: WO2019/181623
Patent Document 2: WO2018/079415

DISCLOSURE OF INVENTION

Technical Problem

As is known in conventional technology, an antenna formed to be capable of receiving radio waves of a predetermined frequency band is provided on a glass plate for a vehicle in some cases. However, electromagnetic waves (noise) of a second frequency band including a frequency band higher than a predetermined first frequency band may be included in an antenna.

The present disclosure provides a vehicle antenna device which can suppress a signal (noise) included in an antenna provided on a glass plate, as electromagnetic waves of a frequency higher than the frequency which the antenna transmits and/or receives, and an in-vehicle system equipped with the vehicle antenna device.

Solution to Problem

According to an aspect of the present disclosure, provided is a vehicle antenna device comprising a glass plate for a vehicle, a first antenna capable of receiving or transmitting radio waves of a first frequency band, provided on the glass plate, and
an electric circuit which attenuates a signal of a second frequency band including a frequency band higher than the first frequency band,
wherein the first antenna has a first feeding portion to be electrically connected to a signal line of a transmission line and a first element connected to the first feeding portion, and
the electric circuit is provided at least one of between the first feeding portion or the vicinity of the first feeding portion and a ground portion, and between the first feeding portion and the signal line.

According to another aspect of the present disclosure, provided is an in-vehicle system comprising the above vehicle antenna device and an electronic device disposed separately from the first antenna,
wherein the electronic device emits electromagnetic waves of the second frequency band.

Advantageous Effects of Invention

According to the present disclosure, it is possible to provide a vehicle antenna device capable of suppressing noise included in an antenna provided on a glass plate, and an in-vehicle system equipped with the vehicle antenna device.

DESCRIPTION OF EMBODIMENTS

Figure 1:
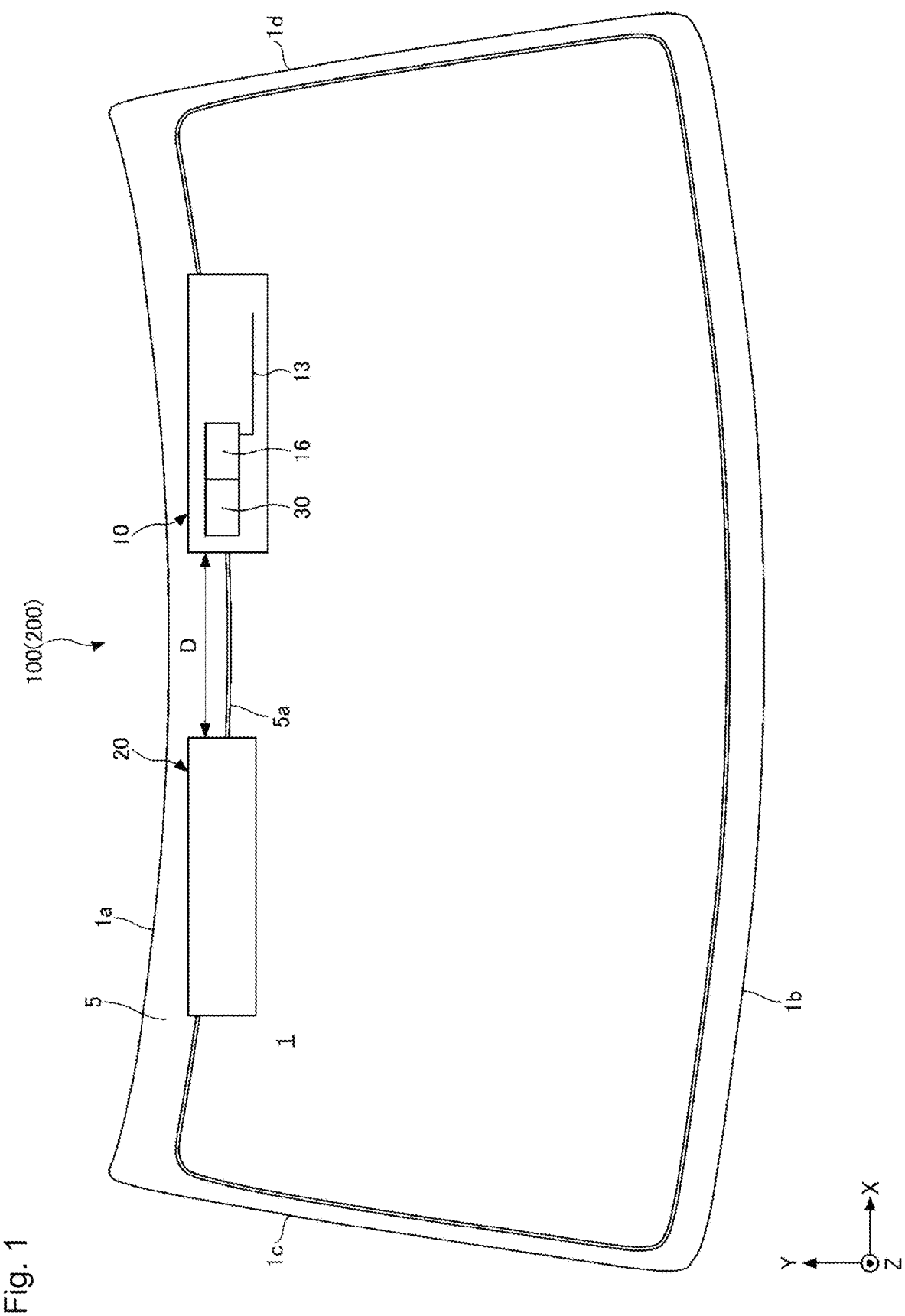
FIG. 1 is a view schematically illustrating an example of the configuration of a vehicle antenna device according to an embodiment in a plan view of a window glass.

An embodiment of the present disclosure will now be described below with reference to the drawings. For easy understanding of the embodiment, the scales of the individual elements in the drawings discussed in the embodiment may be represented differently from those of the actual elements. Terms representing directions, such as "parallel", "at right angles", "perpendicular", "horizontal", "vertical", "top-bottom", and "left-right", are not necessarily to be interpreted in an exact sense, and a certain range of deviation is allowed as long as the operations and the effects of the embodiment are not impaired. The X axis direction, the Y axis direction and the Z axis direction respectively represent a direction parallel to the X axis, a direction parallel to the Y axis and a direction parallel to the Z axis. The X axis direction, the Y axis direction and the Z axis direction are orthogonal to one another. The XY plane, the YZ plane and the ZX plane respectively represent an imaginary plane parallel to the X axis direction and the Y axis direction, an imaginary plane parallel to the Y axis direction and the Z axis direction and an imaginary plane parallel to the Z axis direction and the X axis direction.

Examples of the window glass of a vehicle in the present embodiment include a rear glass fixed to the rear side of a vehicle, a windshield fixed to the front side of a vehicle, a side glass fixed to the lateral sides of a vehicle, and a roof glass fixed to the ceiling of a vehicle. The window glass of a vehicle is not limited to these examples.

FIG. 1 is a view schematically illustrating an example of the configuration of a vehicle antenna device according to an embodiment in a plan view of the window glass. An antenna device 100 shown in FIG. 1 is an example of a vehicle antenna device to be mounted on a vehicle. The antenna device 100 includes an antenna and an electronic device 20 placed proximate to the antenna 10. The antenna is an example of a first antenna capable of receiving radio waves of a first frequency band. The electronic device 20 is a device which emits radio waves of a second frequency band including a frequency band higher than the first frequency band, and its specific examples include an antenna, a visible light camera, a radar and a sensor. Particularly, the electronic device 20 is an example of a second antenna capable of transmitting radio waves of the second frequency band. Hereinafter, unless otherwise specified, the electronic device 20 is explained as an antenna 20.

The antenna 10 may be an antenna capable of transmitting and receiving radio waves of the first frequency band. The antenna 20 may be an antenna capable of transmitting and receiving radio waves of the second frequency band. "Transmitting and receiving" means conducting both transmission and reception. "Receiving (or, transmitting and receiving) radio waves of the first frequency band" means receiving (or, transmitting and receiving) radio waves of some frequency bands included in the first frequency band or means receiving (or, transmitting and receiving) radio waves of all the frequency bands of the first frequency band. "Transmitting (or, transmitting and receiving) radio waves of the second frequency band" means transmitting (or, transmitting and receiving) radio waves of some frequency bands included in the second frequency band or means transmitting (or, transmitting and receiving) radio waves of all the frequency bands of the second frequency band.

The first frequency band is UHF (Ultra High Frequency) band in a range of 300 MHz to 3 GHZ, VHF (Very High Frequency) band in a range of 30 MHz to 300 MHZ, or a band covering both of UHF band and VHF band, for example. A specific example of the frequency bands included in UHF bands includes digital terrestrial television broadcast band (470 MHz to 710 MHZ, for example). Specific examples of the frequency bands included in VHF band include FM broadcast band (76 MHz to 108 MHZ, for example) and band III of DAB broadcast (174 MHz to 240 MHz, for example).

The second frequency band is a radio frequency band of microwaves and millimeter waves (0.3 GHZ to 300 GHz, for example), for example. Specific examples of the frequency bands included in the second frequency band include sub6 band (3.6 GHz to 6 GHz, for example), 2.4 GHz band, 5.2 GHZ, band, 5.3 GHZ band, 5.6 GHz band, 5.8 GHz band, and 5.9 GHz band.

The low frequency range of the second frequency band and the high frequency range of the first frequency band may overlap each other, or may not overlap each other. For example, the second frequency band may be in a range of 617 MHz and higher, while the first frequency band may be in a range of 710 MHz and lower.

The antenna 20 is applicable to V2X communication system, 5G, 6G, and vehicle radar system. The antenna 20 may be applicable to other systems. Specific examples of V2X communication system include a vehicle-to-vehicle communication system and a vehicle-to-road communication system (ETC system, for example).

The antenna 10 is provided on a window glass 1. The antenna 20 is provided on the window glass 1 or in the vicinity of the window glass 1. The "vicinity of the window glass 1" includes, for example, the indoor space of the vehicle separated from the glass surface of the window glass 1 by a range of more than 0 mm up to 100 mm. In this case, the radiating surface of the antenna 20 may be disposed to face the glass surface via a dielectric. The vicinity of the window glass 1 is not restricted to the indoor space of the vehicle, but includes the outdoor space of the vehicle separated from the glass surface of the window glass 1 by a range of more than 0 mm up to 100 mm. In one example of such a case, the antenna 20 is contained in a roof spoiler provided in the vicinity of the rear glass outside the vehicle compartment, the radiating surface of this antenna is separated from the glass surface of the rear glass by a range of more than 0 mm up to 100 mm, and the antenna 10 is provided on the glass surface of the rear glass. The mode in which the antenna is provided in the vicinity of the window glass 1 may include a mode in which the antenna is mounted on a rear side device provided in the vicinity of the rear glass (a high mount stop lamp or a rearview camera, for example) or a mode in which the antenna is disposed in the vicinity of the rear side device. Needless to say, the window glass 1 is not limited to the rear glass and may be other window glass such as a windshield. FIG. 1 illustrates the mode in which both of the antennas 10 and 20 are provided on the surface of the window glass 1 as an example.

The mode in which the antenna is provided on the window glass may be a mode in which the antenna is provided on the surface of the window glass or may be a mode in which it is sealed in the window glass. Specific examples of the vicinity of the window glass may be locations in or on the vehicle separated from the window glass, and may be the roof, console, pillars, garnishes, and mirrors. The mode in which the antenna is provided in the vicinity of the window glass 1 may be a mode in which the antenna is provided on a member attached to the window glass or on a member in the vicinity of the window glass.

At least one of the antennas 10 and 20 may be disposed on a light shielding film 5 formed on the glass surface at the periphery of the window glass 1. Part of or the entire antenna 10 may be disposed on the light shielding film 5, and part of or the entire antenna 20 may be disposed on the light shielding film 5. A specific example of the light shielding film 5 is a ceramic film, such as a black enamel film. When the window glass 1 is viewed from outside of the vehicle, the edge portion farther outward than an inner edge 5a of the light shielding film 5 can hardly be viewed from the outside, and design quality is thus improved.

At least one of the antennas 10 and 20 may be provided in a location other than along a glass edge 1a on the top side of the window glass 1 (in other words, the edge of the top side of a window frame, which is not shown, to which the window glass 1 is attached) as shown in FIG. 1. For example, at least one of the antennas and 20 may be provided along a glass edge 1b of the bottom side of the window glass 1 (edge of the bottom side of the window frame), a glass edge 1c on the left side of the window glass 1 (edge of the left side of the window frame), or a glass edge 1d on the right side of the window glass 1 (edge of the right side of the window frame).

The antenna 10 has a feeding portion 16 to be electrically connected to a signal line (not shown) of a transmission line such as a coaxial cable, and an antenna element 13 electrically connected to the feeding portion 16. The feeding portion 16 is an example of the first feeding portion. The feeding portion 16 is a feeding point which is positioned between the signal line of the transmission line and the antenna element 13, and may, for example, be a feeding electrode. The antenna element 13 is an example of the first element. The antenna 10 may be a monopole antenna using an external ground, such as a metal body of the vehicle, or may be a dipole antenna further having a ground electrode which is not shown.

The antenna device 100 comprises an electric circuit 30. The electric circuit has a structure to attenuate a signal of the second frequency band including a frequency band higher than the first frequency band. The electric circuit 30 is a circuit that allows a signal of the first frequency band to pass therethrough substantially without attenuating this signal and that attenuates a signal of the second frequency band by a greater amount than a signal of the first frequency band. The electric circuit 30 functions as a low pass filter.

The electric circuit 30 is provided at least one of between the feeding portion 16 or the vicinity of the feeding portion 16 and the ground portion, and between the feeding portion 16 and the signal line of the transmission line. By the electric circuit that attenuates the signal of the second frequency band being provided at such a position, isolation between the antennas 10 and 20 in the second frequency band can be secured. This can prevent disturbance of a desired signal which the antenna 10 should transmit/receive, due to an unnecessary signal (noise) containing components of the second frequency band included into the antenna 10, even when the antennas and 20 are placed proximate to each other. The "vicinity of the feeding portion 16" means, for example, a portion near the feeding portion 16 in the antenna element 13 connected to the feeding portion 16. In other words, the electric circuit may be disposed between the portion near the feeding portion 16 in the antenna element 13, and the ground portion.

For example, a signal containing components of the second frequency band transmitted from the antenna 20 and included into the antenna 10, is suppressed by the electric circuit 30, whereby a signal of an unnecessary frequency band propagating into a receiving device to be connected to the feeding portion 16 via the a signal line of the transmission line reduces, and the receiving quality will improve.

Further, for example, in a case where the antenna 10 is the antenna capable of transmitting radio waves of the first frequency band, an unnecessary signal containing components of the second frequency band radiating from the antenna 10 is suppressed by the electric circuit 30. Thus, inclusion of a signal containing components of the second frequency band from the antenna 10 into the antenna 20 is suppressed. Accordingly, in a case where a receiving device is to be connected to the feeding portion of the antenna 20 via the signal line of the transmission line, a signal of an unnecessary frequency band propagating into the receiving device reduces, and the receiving quality will improve.

When the distance D between the antenna 10 and the antenna 20 is 100 mm or less, an unnecessary signal containing components of the second frequency band is likely to be included into the antenna 10, but the antenna 10 including the electric circuit 30 can suppress the unnecessary signal. If the distance D exceeds 100 mm, the antenna 10 and the antenna 20 are excessively separated from each other, and it is difficult to secure a space in which the antennas 10 and 20 are provided, and the degree of freedom of layout may be impaired. If the distance D between the antennas 10 and 20 exceeds 100 mm, a certain level of isolation in a predetermined frequency band can easily be secured even without providing the electric circuit 30. When the distance D between the antenna 10 and the antenna 20 is 70 mm or less, the antenna 10 can effectively suppress the unnecessary signal containing components of the second frequency band. When the distance D is 50 mm or less, the antenna 10 can more effectively suppress the unnecessary signal containing components of the second frequency band. When the distance D is 45 mm or less, the antenna 10 can more effectively suppress the unnecessary signals containing components of the second frequency band. When the distance D is 40 mm or less, the antenna 10 can particularly effectively suppress the unnecessary signal containing components of the second frequency band. The lower limit of the distance D is not limited so long as the antenna 10 and the antenna 20 are separated, and for example, the distance D is 5 mm or more, 10 mm or more, or 15 mm or more. The distance D is the shortest distance between the antennas 10 and and is, for example, the shortest distance between the antenna element of the antenna 10 and that of the antenna 20. The distance D may be the shortest distance between a portion of the antenna element where the highest current flows of one of the antennas 10 and 20 and such a portion of the other one of the antennas 10 and 20.

The electric circuit 30 is preferably constituted so that at least a part of the receiving power of the second frequency band is decreased by 3 dB or more as compared with a case where no electric circuit 30 is provided, whereby isolation between the antenna 10 and the antenna 20 in the second frequency band can be secured. This can suppress the signal containing components of the second frequency band included in the antenna 10 even when the antenna 10 and the antenna 20 are placed proximate to each other.

Figure 2:
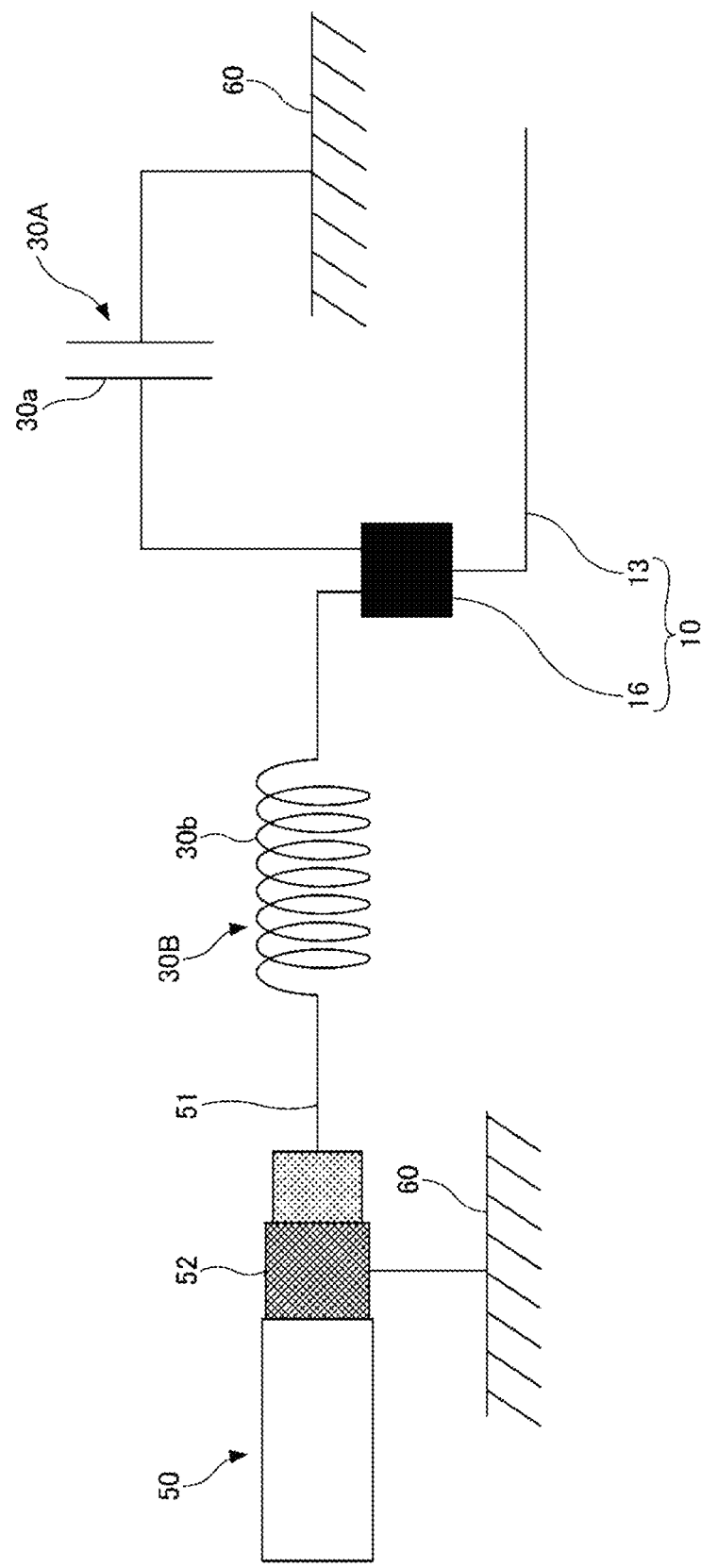
FIG. 2 is a view illustrating a first example of the configuration and a second example of the configuration of an electric circuit.

FIG. 2 is a view illustrating a first example of the configuration and a second example of the configuration of the electric circuit. In FIG. 2, as the electric circuit which attenuates a signal of the second frequency band, an electric circuit 30A and an electric circuit 30B are exemplified. Only one of the electric circuit 30A and the electric circuit 30B may be provided, or both may be provided.

The electric circuit 30A is provided between the feeding portion 16 or the vicinity of the feeding portion 16 and a ground portion 60. The vicinity of the feeding portion 16 may be a bottom portion of the antenna element 13 to be connected to the feeding portion 16.

The electric circuit 30A includes a capacitive coupling 30a between the feeding portion 16 or the vicinity of the feeding portion 16 and the ground portion 60. The capacitance of the capacitive coupling 30a is adjusted so that the signal containing components of the second frequency band included into the antenna 10 can be attenuated to a predetermined level. The capacitive coupling 30a is formed, for example, by a configuration including a capacitive element or a dielectric layer.

By the electric circuit 30A including the capacitive coupling 30a, the signal of the second frequency band propagating from the antenna element 13 to the feeding portion 16 is attenuated. By the electric circuit 30A including the capacitive coupling 30a, a signal of harmonics included in the second frequency band propagating from a signal line (inner conductor 51) of a coaxial cable 50 to the feeding portion 16 may be attenuated.

The coaxial cable 50 is an example of the transmission line. The coaxial cable 50 has the inner conductor 51 and an outer conductor 52. The inner conductor 51 is an example of the signal line of the transmission line, and the outer conductor 52 is an example of the ground conductor of the transmission line. At one end portion of the coaxial cable 50, the inner conductor 51 is electrically connected to the feeding portion 16, and the outer conductor 52 is grounded to the ground portion 60. The other end portion of the coaxial cable 50 is electrically connected to the receiving device.

The electric circuit 30B is provided between the feeding portion 16 and the inner conductor 51. The electric circuit 30B includes, in this example, an inductor 30b inserted in series between the feeding portion 16 and the inner conductor 51. The inductance of the inductor 30b is adjusted so that the signal containing components of the second frequency band included into the antenna 10 is attenuated to a predetermined level. The inductor 30b may, for example, be a coil.

By including the inductor 30b, the electric circuit 30B attenuates the signal of the second frequency band propagating from the antenna element 13 to the coaxial cable 50 by way of the feeding portion 16. By including the inductor 30b, the electric circuit 30B may attenuates the signal of harmonics contained in the second frequency band propagating from the signal line (the inner conductor 51) of the coaxial cable 50 to the feeding portion 16.

Now, several specific examples of the configuration of the electric circuit 30A will be described. In each example of the configuration, the electric circuit 30B may be provided or may not be provided. So long as the isolation between the antenna and the antenna 20 in the vehicle antenna device 100 can be secured by the electric circuit 30A, provision of the electric circuit 30B may be omitted for simplification.

Figure 3:
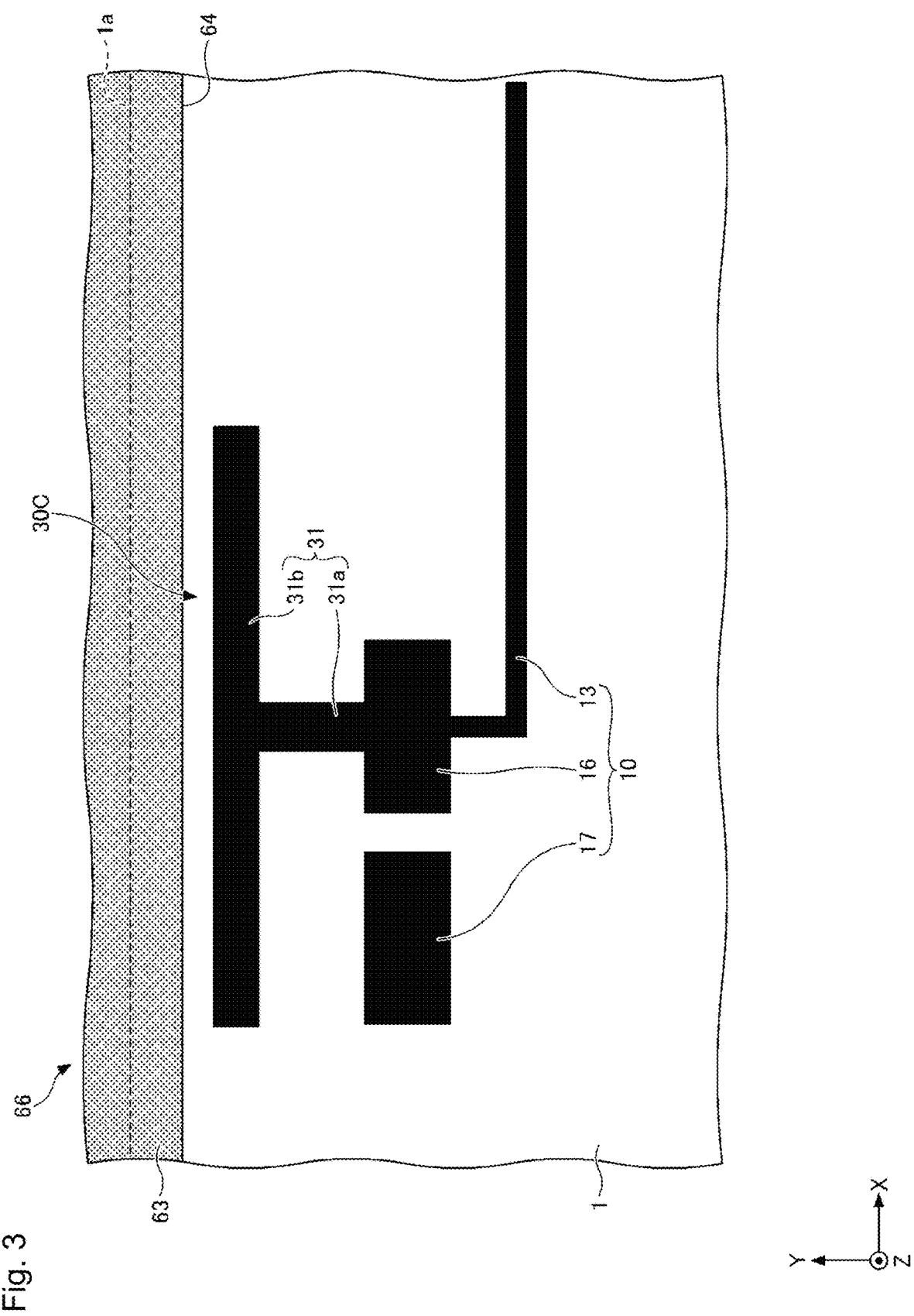
FIG. 3 is a plan view illustrating a third example of the configuration of an electric circuit.
Figure 4:
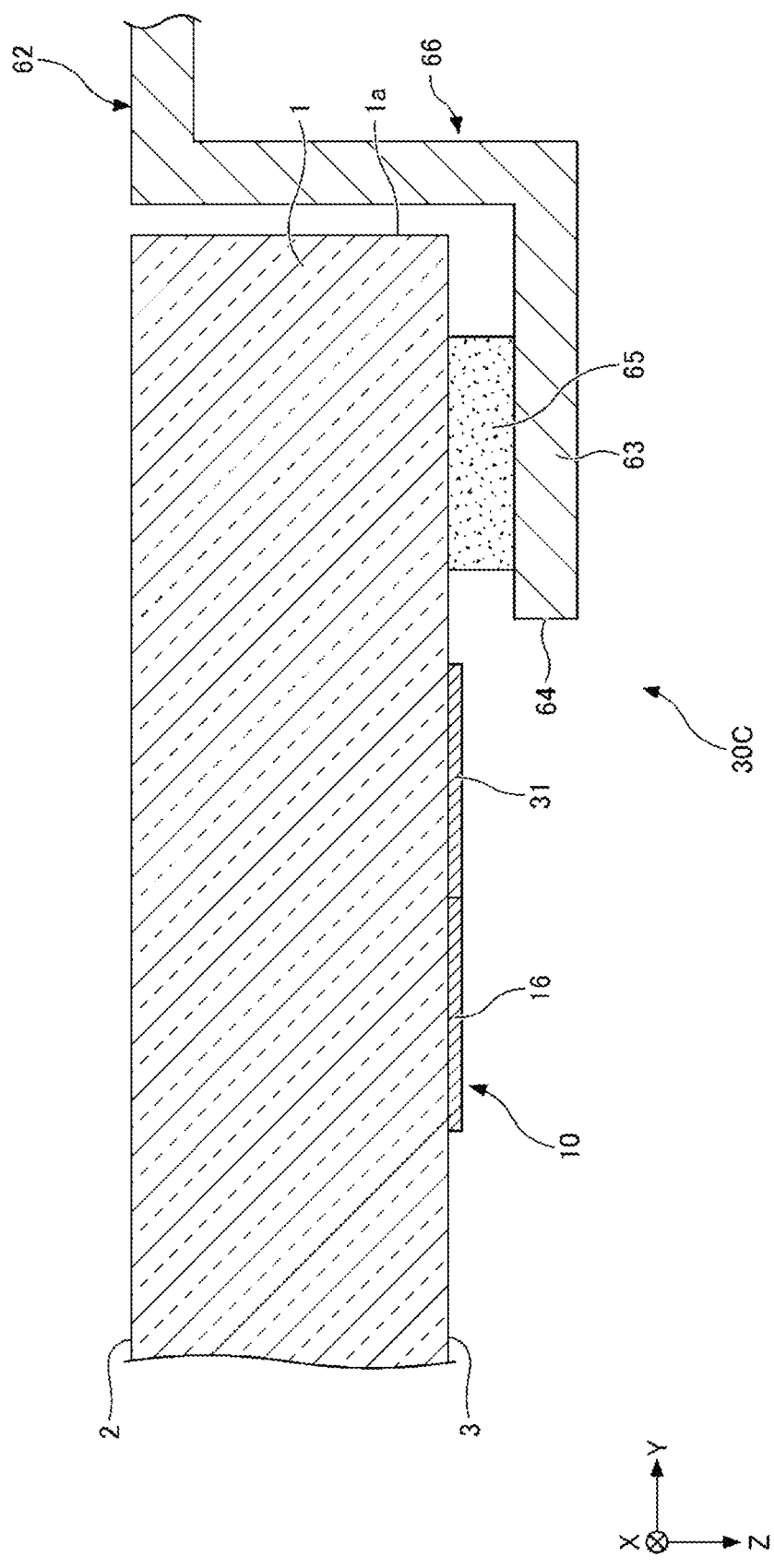
FIG. 4 is a cross sectional view illustrating a third example of the configuration of an electric circuit.

FIG. 3 is a plan view illustrating a third example of the configuration of the electric circuit. FIG. 4 is a cross sectional view illustrating the third example of the configuration of the electric circuit. In FIGS. 3 and 4, as the electric circuit which attenuates the signal of the second frequency band, an electric circuit 30C is exemplified. In FIGS. 3 and 4, in a state where the window glass 1 is attached to a window frame 66 formed on a vehicle 62 shown in FIG. 4, the positive side of the Z axis direction indicates the vehicle interior side, and the negative side of the Z axis direction indicates the vehicle exterior side.

The window glass 1 has a main surface 2 (an example of the first main surface) which faces the negative side of the Z axis direction and a main surface 3 (an example of a second main surface which faces the opposite side from the first main surface) which faces the positive side of the Z axis direction. The window glass 1 is attached, for example, by a peripheral portion of the main surface 3 and a flange window frame 66 being bonded by an adhesive 65 such as a urethan resin, to the window frame 66. The window frame 66 has a metal portion 63 which faces at least a part of the peripheral portion of the main surface 3 in a plan view of the window glass 1 from the Z axis direction. An inner edge 64 of the metal portion 63 forms an opening to be covered by the window glass 1 in a plan view of the window glass 1 from the Z axis direction. The window glass 1 is an example of the glass plate of a vehicle and is in a plate shaped product containing a dielectric such as glass as the main component.

The electric circuit 30C is provided between the vicinity of the feeding portion 16 and the metal portion 63. The above-described ground portion 60 may include the metal portion 63 on the vehicle exterior side. In this example, the electric circuit 30C includes an extending conductor 31 electrically connected to the feeding portion 16, and an air layer interposed between the extending conductor 31 and the metal portion 63. The air layer is an example of a dielectric layer and in this example, is interposed between the extending conductor 31 and the inner edge 64. By the air layer, a capacitive coupling is formed. By including the capacitive coupling formed by the air layer, the electric circuit 30C attenuates the signal of the second frequency band. A dielectric layer different from the air layer may further be included between the extending conductor 31 and the metal portion 63.

In the third example of the configuration shown in FIGS. 3 and 4, the antenna element 13, the feeding portion 16 and the extending conductor 31 are formed on the main surface 3 of the window glass 1. The antenna element 13 is an L-shaped linear conductor, but its shape is not limited to the L-shape and may be T-shape, loop shape or any optional shape having a plurality of open ends including branches. Further, the antenna element 13 may have a (patterned) shape such that a plurality of linear conductors extend in optional directions from the feeding portion 16. The feeding portion 16 is a rectangular planar conductor. The extending conductor 31 is a linear or planar conductor extending from the feeding portion 16. The extending conductor 31 is, in this example, a T-shaped conductor having a conductor portion 31a extending from the feeding portion 16 toward the positive side of the Y axis direction and a conductor portion 31b intersecting with the conductor portion 31a. The conductor portion 31b extends toward the X axis direction along the inner edge 64.

In a state where the window glass 1 is attached to the window frame 66, the feeding portion 16 and the extending conductor 31 do not overlap the metal portion 63 each other in a plan view of the window glass 1. In such a manner, even when the feeding portion 16 and the metal portion 63 are relatively separated from each other in a state where the window glass 1 is attached to the window frame 66, by providing the extending conductor 31, the capacitive coupling can easily be formed between the feeding portion 16 and the metal portion 63, and adjustment to a desired coupling capacity is possible.

The antenna 10 may have a feeding portion 17 to be electrically connected to the ground conductor of the transmission line (for example, the outer conductor 52 of the above-described coaxial cable 50). The feeding portion 17 is an example of the second feeding portion, and in this example, a ground electrode formed on the main surface 3. Since the antenna 10 has a feeding electrode (the feeding portion 16) and a ground electrode (the feeding portion 17), a connector terminal which is not shown, to connect the antenna 10 (specifically the electrode of the antenna 10) and the coaxial cable, may be attached.

Figure 5:
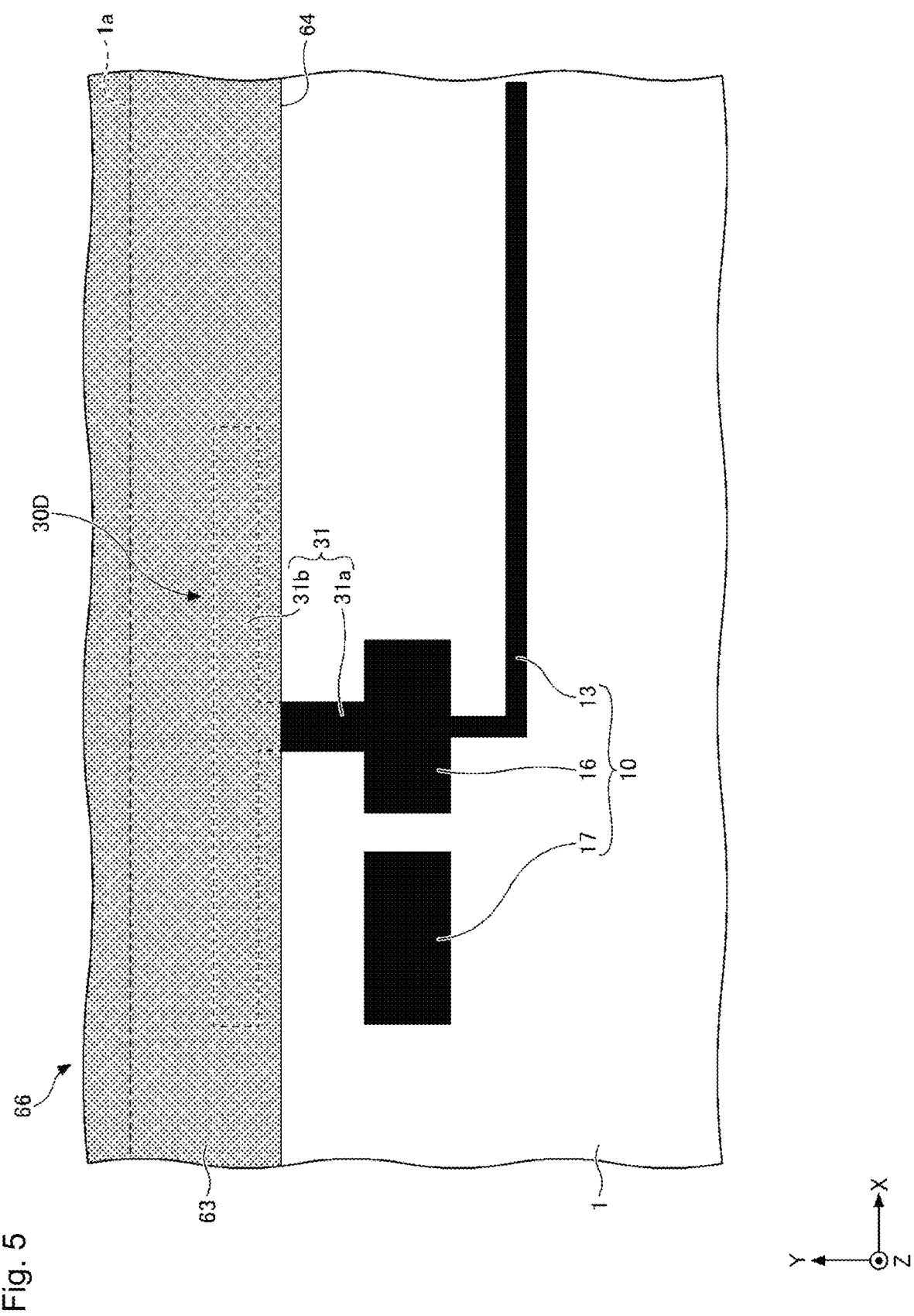
FIG. 5 is a plan view illustrating a fourth example of the configuration of an electric circuit.
Figure 6:
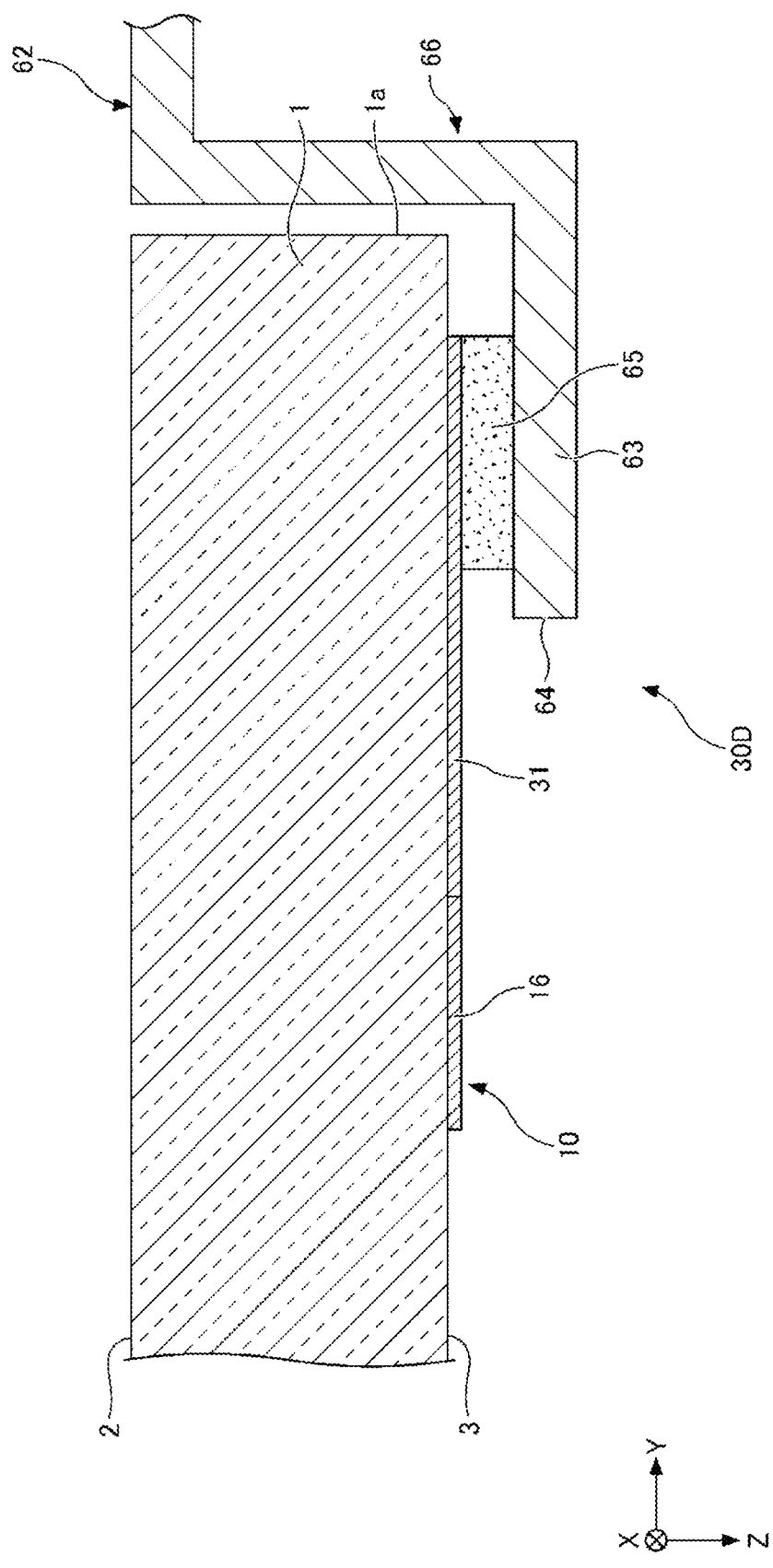
FIG. 6 is a cross sectional view illustrating a fourth example of the configuration of an electric circuit.

FIG. 5 is a plan view illustrating a fourth example of the configuration of the electric circuit. FIG. 6 is a cross sectional view illustrating the fourth example of the configuration of the electric circuit. In the fourth example of the configuration, description of the configuration, functions and effects similar to those of the above-described examples of the configuration is omitted by citing the above descriptions.

In FIGS. 5 and 6, as the electric circuit which attenuates the signal of the second frequency band, an electric circuit 30D is exemplified. In FIGS. 5 and 6, at least a part (the conductor portion 31b in this example) of the extending conductor 31 overlaps the metal portion 63 in a plan view of the window glass 1.

The electric circuit 30D is provided between the vicinity of the feeding portion 16 and the metal portion 63. In this example, the electric circuit 30D includes the extending conductor 31 electrically connected to the feeding portion 16 and an adhesive 65 interposed between the extending conductor 31 and the metal portion 63. The adhesive 65 is an example of the dielectric layer and in this example, it is interposed between the conductor portion 31b of the extending conductor 31 and an attaching surface of the metal portion 63. By the adhesive 65, a capacitive coupling is formed. By including the capacitive coupling formed by the adhesive 65, the electric circuit 30D attenuates the signal of the second frequency band. Between the extending conductor 31 and the metal portion 63, a dielectric layer different from the adhesive 65 may further be included.

In a state where the window glass 1 is attached to the window frame 66, the feeding portion 16 does not overlap the metal portion 63 in a plan view of the window glass 1, but at least a part of the extending conductor 31 overlaps the metal portion 63 in a plan view of the window glass 1. In such a manner, even when the feeding portion 16 and the metal portion 63 are relatively separated from each other in a state where the window glass 1 is attached to the window frame 66, by providing the extending conductor 31, the capacitive coupling can easily be formed between the feeding portion 16 and the metal portion 63, and adjustment to a desired coupling capacity is possible.

Figure 7:
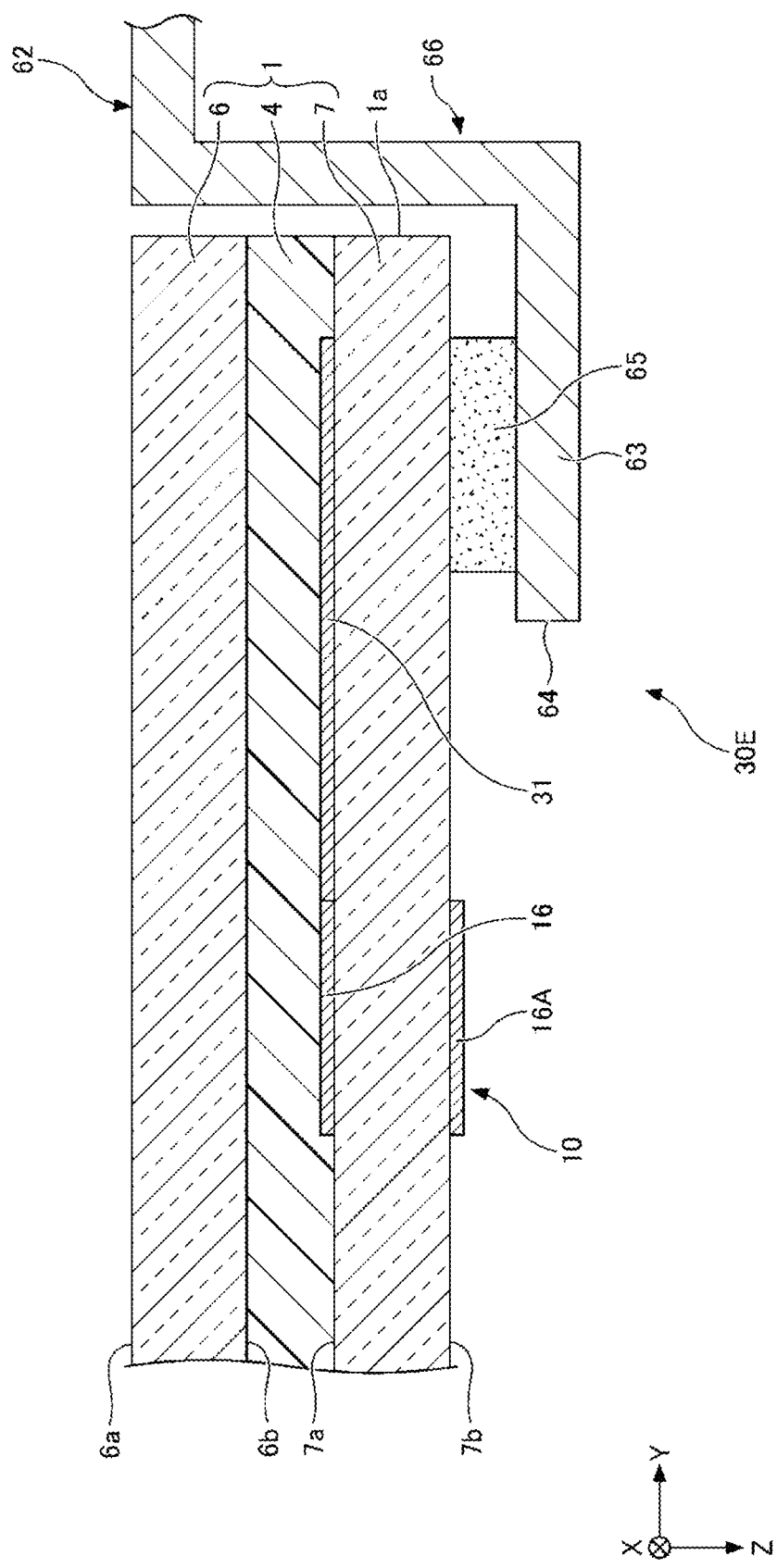
FIG. 7 is a cross sectional view illustrating a fifth example of the configuration of an electric circuit.

FIG. 7 is a cross sectional view illustrating a fifth example of the configuration of the electric circuit. In the fifth example of the configuration, description of the configuration, functions and effects similar to those of the above-described examples of the configuration is omitted by citing the above descriptions. In FIG. 7, as the electric circuit which attenuates the signal of the second frequency band, an electric circuit 30E is exemplified. In FIG. 7, the feeding portion 16 and the extending conductor 31 are sealed in the window glass 1.

In the example shown in FIG. 7, the window glass 1 is a laminated glass having a glass plate 6 disposed on the vehicle exterior side and a glass plate 7 disposed on the vehicle interior side bonded via an interlayer 4. The interlayer 4 is disposed as sandwiched between the glass plate 6 and the glass plate 7.

The glass plate 6 and the glass plate 7 are a transparent plate-shaped dielectric. Either one or both of the glass plate 6 and the glass plate 7 may be translucent. The glass plate 6 is an example of the first glass plate. The glass plate 7 is an example of the second glass plate which faces the first glass plate.

The glass plate 6 has a main surface 6a, and a main surface 6b on the opposite side from the main surface 6a in the Z axis direction. The main surface 6a means the surface on the vehicle exterior side, and the main surface 6b means the surface on the vehicle interior side.

The glass plate 7 has a main surface 7a which faces the main surface 6b of the glass plate 6, and a main surface 7b on the opposite side from the main surface 7a in the Z axis direction. The main surface 7a means the surface on the vehicle exterior side, and the main surface 7b means the surface on the vehicle interior side. The main surface 7b is the surface of the glass plate 7 on the opposite side from the interlayer 4.

The interlayer 4 is a transparent or translucent dielectric having dielectric property and interposed between the glass plate 6 and the glass plate 7. The glass plate 6 and the glass plate 7 are bonded by the interlayer 4. The interlayer 4 may be formed of, for example, thermoplastic polyvinyl butyral (PVB), an ethylene/vinyl acetate copolymer (EVA) or a cycloolefin polymer (COP).

The electric circuit 30E is provided between the periphery of the feeding portion 16 and the metal portion 63. In this example, the electric circuit 30E includes the extending conductor 31 electrically connected to the feeding portion 16, and the glass plate 7 and the adhesive 65 which are interposed between the extending conductor 31 and the metal portion 63. The glass plate 7 and the adhesive 65 are an example of the dielectric layer and in this example, they are interposed between the extending conductor 31 and an attaching surface of the metal portion 63. By the glass plate 7 and the adhesive 65, a capacitive coupling is formed. By including the capacitive coupling formed by the glass plate 7 and the adhesive 65, the electric circuit 30E attenuates the signal of the second frequency band. Between the extending conductor 31 and the metal portion 63, a dielectric layer different from the glass plate 7 and the adhesive 65 may further be included. The glass plate 7 may have, for example, a thickness of 0.5 mm to 5.0 mm, or 1.5 mm to 2.5 mm. The coupling capacity between the extending conductor 31 and the metal portion 63 may be adjusted considering the thickness and the glass composition of the glass plate 7.

In the electric circuit 30E, the feeding portion 16 and the extending conductor 31 are formed on the main surface 7a of the glass plate 7. However, the feeding portion 16 and the extending conductor 31 may be formed on the main surface 6b of the glass plate 6 or may be disposed between a plurality of the interlayers 4.

In the electric circuit 30E, the feeding portion 16 is to be electrically connected to the feeding portion 16A which the feeding portion 16 faces with the glass plate 7 sandwiched therebetween via the capacitive coupling formed by the glass plate 7. The feeding portion 16A is a plate-shaped conductor formed on the main surface 7b of the glass plate 7 and is to be electrically connected to the signal line of the transmission line such as a coaxial cable.

In a state where the window glass 1 is attached to the window frame 66, the feeding portion 16 does not overlap the metal portion 63 in a plan view of the window glass 1, but at least a part of the extending conductor 31 overlaps the metal portion 63 in a plan view of the window glass 1. The feeding portion 16 is further sealed in the window glass 1. In such a manner, even when the feeding portion 16 and the metal portion 63 are relatively separated from each other in a state where the window glass 1 is attached to the window frame 66, by providing the extending conductor 31, the capacitive coupling can easily be formed between the feeding portion 16 and the metal portion 63, and adjustment to a desired coupling capacity is possible.

Figure 8:
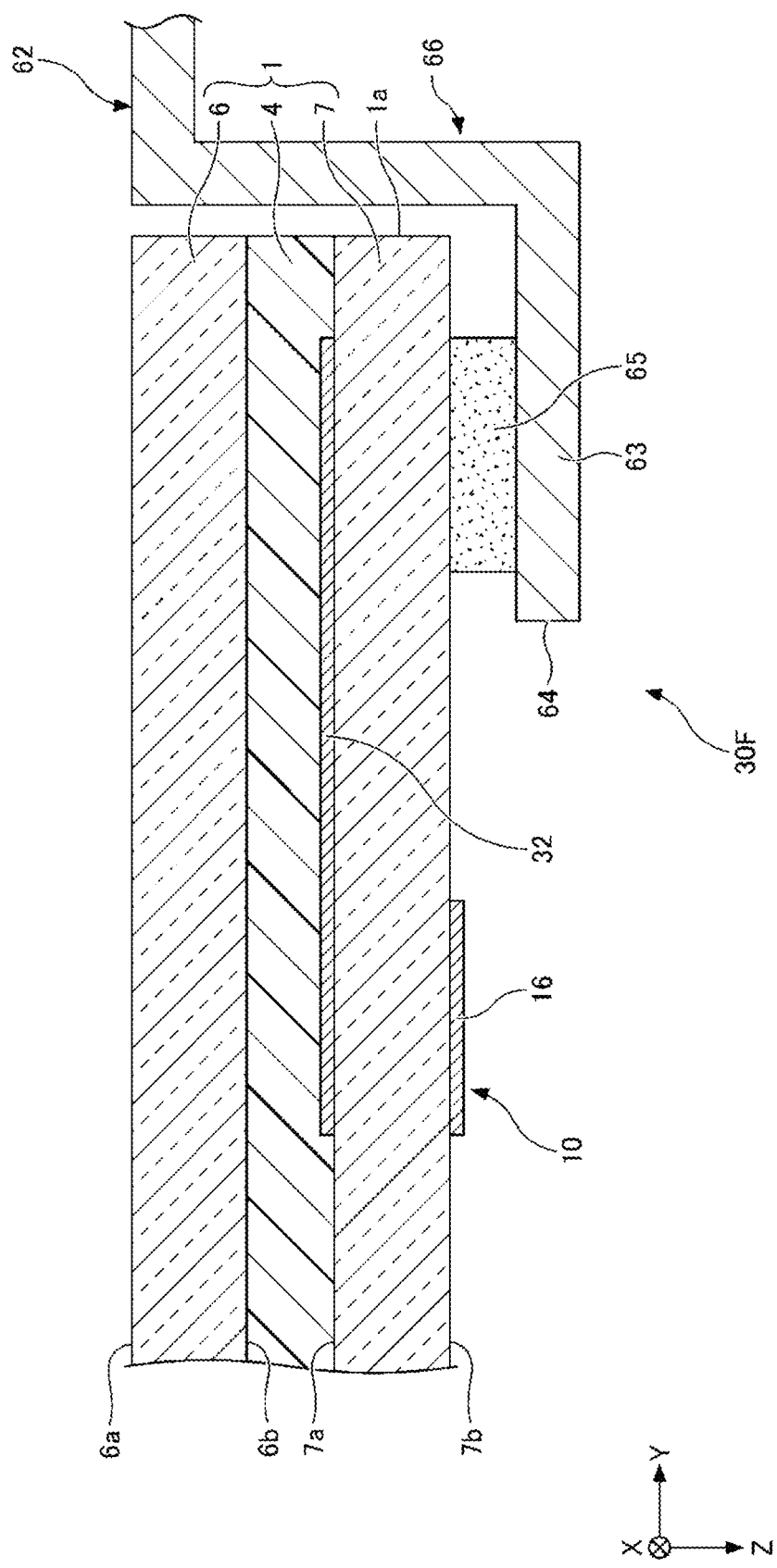
FIG. 8 is a cross sectional view illustrating a sixth example of the configuration of an electric circuit.

FIG. 8 is a cross sectional view illustrating a sixth example of the configuration of the electric circuit. In the sixth example of the configuration, description of the configuration, functions and effects similar to those of the above-described examples of the configuration is omitted by citing the above descriptions. In FIG. 8, as the electric circuit which attenuates the signal of the second frequency band, an electric circuit 30F is exemplified. In the sixth example of the configuration shown in FIG. 8, the feeding portion 16 is not sealed in the window glass 1, and a conductor layer 32 is sealed in the window glass 1.

The electric circuit 30F is provided between the vicinity of the feeding portion 16 and the metal portion 63. In this example, the electric circuit 30F includes the conductor layer 32 electrically connected to the feeding portion 16 by a capacitive coupling, and the glass plate 7 and the adhesive 65 interposed between the conductor layer 32 and the metal portion 63. The glass plate 7 and the adhesive 65 are an example of the dielectric layer and in this example, they are interposed between the conductor layer 32 and an attaching surface of the metal portion 63. By the glass plate 7 and the adhesive 65, the capacitive coupling is formed. By including the capacitive coupling formed by the glass plate 7 and the adhesive 65, the electric circuit 30F attenuates the signal of the second frequency band. Between the conductor layer 32 and the metal portion 63, a dielectric layer different from the glass plate 7 and the adhesive 65 may further be included.

In the electric circuit 30F, the conductor layer 32 is formed on the main surface 7a of the glass plate 7. However, the conductor layer 32 may be formed on the main surface 6b of the glass plate 6 or may be disposed between layers of the interlayer 4 composed of a plurality of layers. FIG. 8 is a cross sectional view illustrating the sixth example of the configuration, and no plan view of the conductor layer 32 is illustrated, but the configuration may be properly adjusted to achieve a desired coupling capacity.

In the electric circuit 30F, the conductor layer 32 is to be electrically connected to the feeding portion 16 which the conductor layer 32 faces with the glass plate 7 sandwiched therebetween, via the capacitive coupling formed by the glass plate 7. The feeding portion 16 is a plate-shaped conductor formed on the main surface 7b of the glass plate 7 and is to be electrically connected to the signal line of the transmission line such as a coaxial cable.

In a state where the window glass 1 is attached to the window frame 66, the feeding portion 16 does not overlap the metal portion 63 in a plan view of the window glass 1, but at least a part of the conductor layer 32 overlaps the metal portion 63 in a plan view of the window glass 1. In such a manner, even when the feeding portion 16 and the metal portion 63 are relatively separated from each other in a state where the window glass 1 is attached to the window frame 66, by providing the conductor layer 32, the capacitive coupling can easily be formed between the feeding portion 16 and the metal portion 63, and adjustment to a desired coupling capacity is possible.

Figure 9:
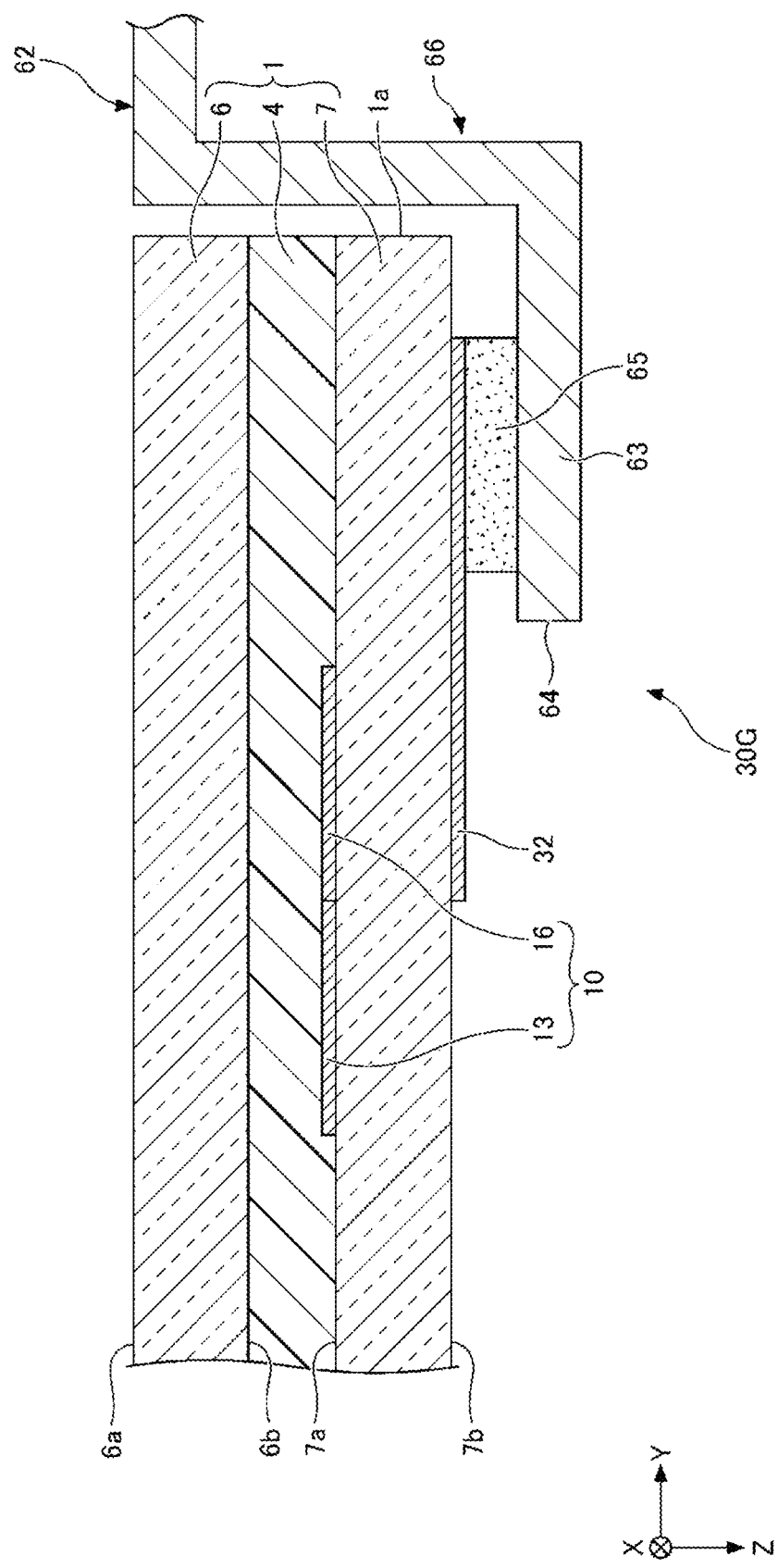
FIG. 9 is a cross sectional view illustrating a seventh example of the configuration of an electric circuit.

FIG. 9 is a cross sectional view illustrating a seventh example of the configuration of the electric circuit. In the seventh example of the configuration, description of the configuration, functions and effects similar to those of the above-described examples of the configuration is omitted by citing the above descriptions. In FIG. 9, as the electric circuit which attenuates the signal of the second frequency band, an electric circuit 30G is exemplified. In FIG. 9, the antenna 10 having the antenna element 13 and the feeding portion 16 is sealed in the window glass 1.

The electric circuit 30G is provided between the periphery of the feeding portion 16 and the metal portion 63. In this example, the electric circuit 30G includes the conductor layer 32 electrically connected to the feeding portion 16 by a capacitive coupling formed by the glass plate 7, and the adhesive 65 interposed between the conductor layer 32 and the metal portion 63. The adhesive 65 is an example of the dielectric layer and in this example, it is interposed between the conductor layer 32 and an attaching surface of the metal portion 63. A first capacitive coupling is formed by the glass plate 7, and a second capacitive coupling is formed by the adhesive 65. By including the capacitive coupling formed by the glass plate 7 and the adhesive 65, the electric circuit 30G attenuates the signal of the second frequency band. Between the conductor layer 32 and the metal portion 63, a dielectric layer different from the adhesive 65 may further be included.

In the electric circuit 30G, the conductor layer 32 is formed on the main surface 7b of the glass plate 7. The conductor layer 32 is to be electrically connected to the feeding portion 16 which the conductive layer 32 faces with the glass plate 7 sandwiched therebetween, via the capacitive coupling formed by the glass plate 7. The feeding portion 16 is a plate-shaped conductor formed on the main surface 7a of the glass plate 7 and is to be electrically connected to the signal line of the transmission line such as a coaxial cable via a flat cable which is not shown or the like. The flat cable has a structure such that it enters into the window glass 1 from a periphery (for example, glass edge 1a) of the window glass 1 and is in contact with the feeding portion 16.

Figure 10:
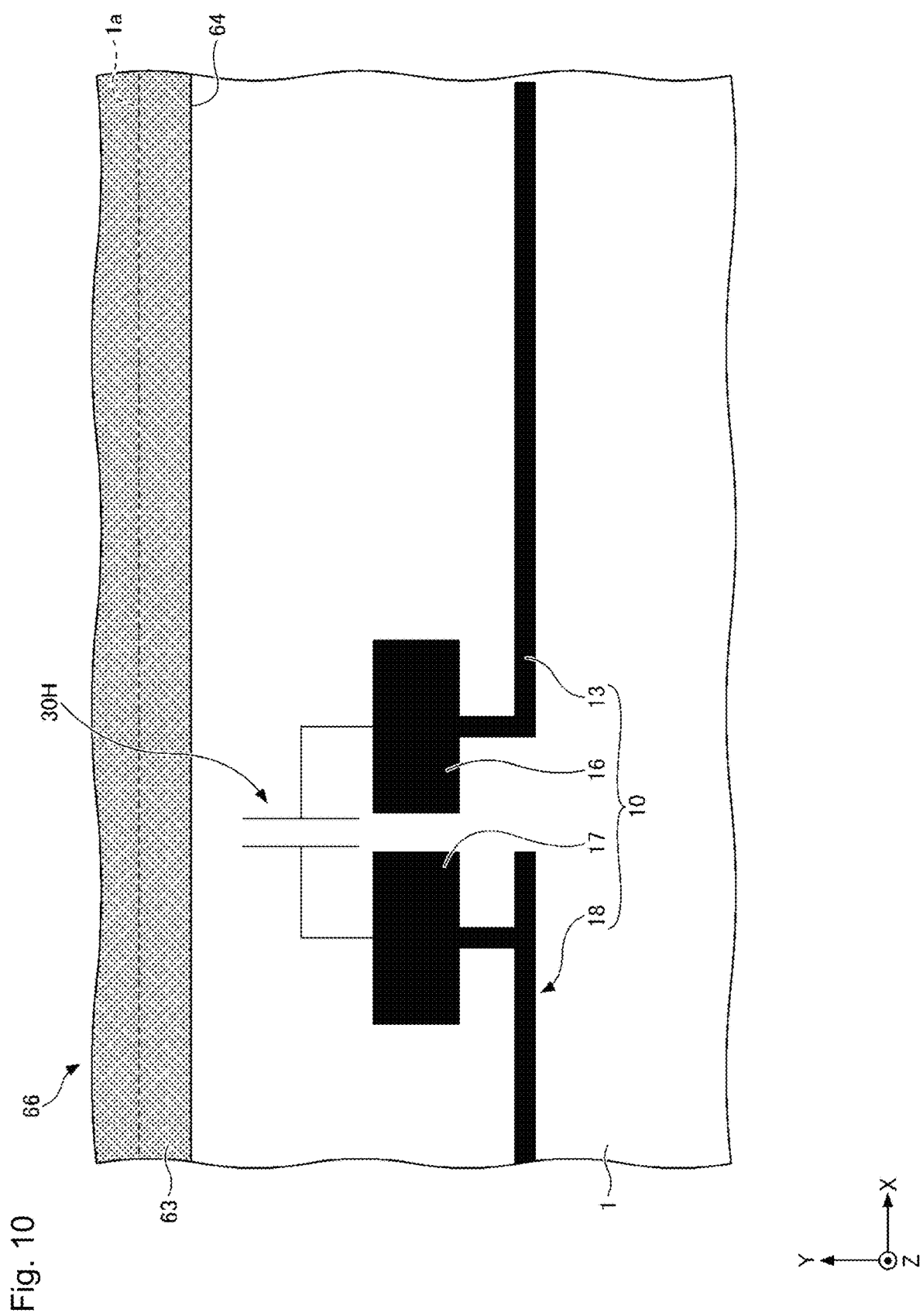
FIG. 10 is a plan view illustrating an eighth example of the configuration of an electric circuit.

FIG. 10 is a plan view illustrating an eighth example of the configuration of the electric circuit. In the eighth example of the configuration, description of the configuration, functions and effects similar to those of the above-described examples of the configuration is omitted by citing the above descriptions. In FIG. 10, as the electric circuit which attenuates the signal of the second frequency band, an electric circuit 30H is exemplified. In FIG. 10, the antenna 10 has a feeding portion 17 to be electrically connected to the ground conductor of the transmission line (for example the outer conductor 52 of the above-described coaxial cable 50).

The feeding portion 17 is an example of the second feeding portion and in this example, it is a ground electrode formed on the main surface which is the same as that of the feeding portion 16.

The electric circuit 30H is provided between the feeding portion 16 and the feeding portion 17. The above described ground portion 60 may include the feeding portion 17. By including a capacitive coupling between the feeding portion 16 and the feeding portion 17, the electric circuit 30H attenuates the signal of the second frequency band. The capacitive coupling between the feeding portion 16 and the feeding portion 17 is formed, for example, by the configuration including a capacitive element or a dielectric layer.

The antenna 10 may have a ground element 18 to be electrically connected to the feeding portion 17. The ground element 18 is an example of a second element. By providing the ground element 18, the antenna gain of the antenna 10 can be adjusted. The ground element 18 may have a T-shape, a loop shape or any optional shape having a plurality of open ends including branches. The ground element 18 may have a (patterned) shape such that a plurality of linear conductors extend in optional directions from the feeding portion 17.

Figure 11:
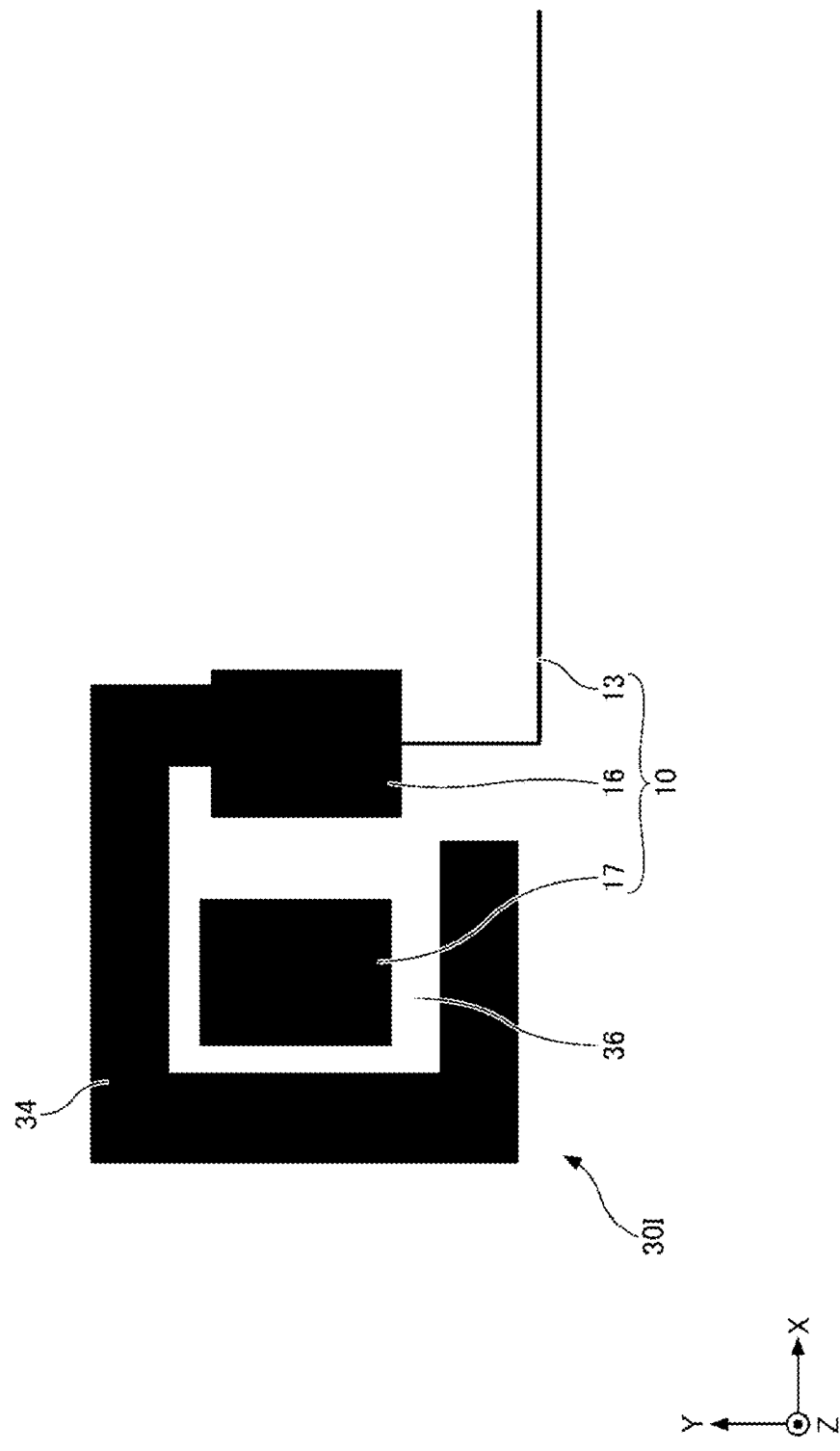
FIG. 11 is a plan view illustrating a ninth example of the configuration of an electric circuit.

FIG. 11 is a plan view illustrating a ninth example of the configuration of the electric circuit. In the ninth example of the configuration, description of the configuration, functions and effects similar to those of the above-described examples of the configuration is omitted by citing the above descriptions. In FIG. 11, as the electric circuit which attenuates the signal of the second frequency band, an electric circuit 30I is exemplified. The electric circuit 30I has a capacitive coupling formed by an extending conductor 34 and a gap 36, between the feeding portion 16 and the feeding portion 17.

The electric circuit 30I is provided between the feeding portion 16 and the feeding portion 17. In this example, the electric circuit 30I includes the extending conductor 34 electrically connected to the feeding portion 16, and the gap 36 interposed between the extending conductor 34 and the feeding portion 17. The gap 36 is an example of the dielectric layer and in this example, it is interposed in a direction parallel to the XY plane. The capacitive coupling is formed by the extending conductor 34 and the gap 36. By including the capacitive coupling formed by the extending conductor 34 and the gap 36, the electric circuit 30I attenuates the signal of the second frequency band.

The extending conductor 34 is a linear or planar conductor formed on a plane which is the same as that of the antenna 10. The extending conductor 34 extends from the feeding portion 16 so as to form the gap 36 between the extending conductor 34 and the feeding portion 17. By the extending conductor 34 extending so as to surround the feeding portion 17, adjustment to a desired coupling capacity is possible such that the capacitive coupling between the feeding portion 16 and the feeding portion 17 is enhanced.

Figure 12:
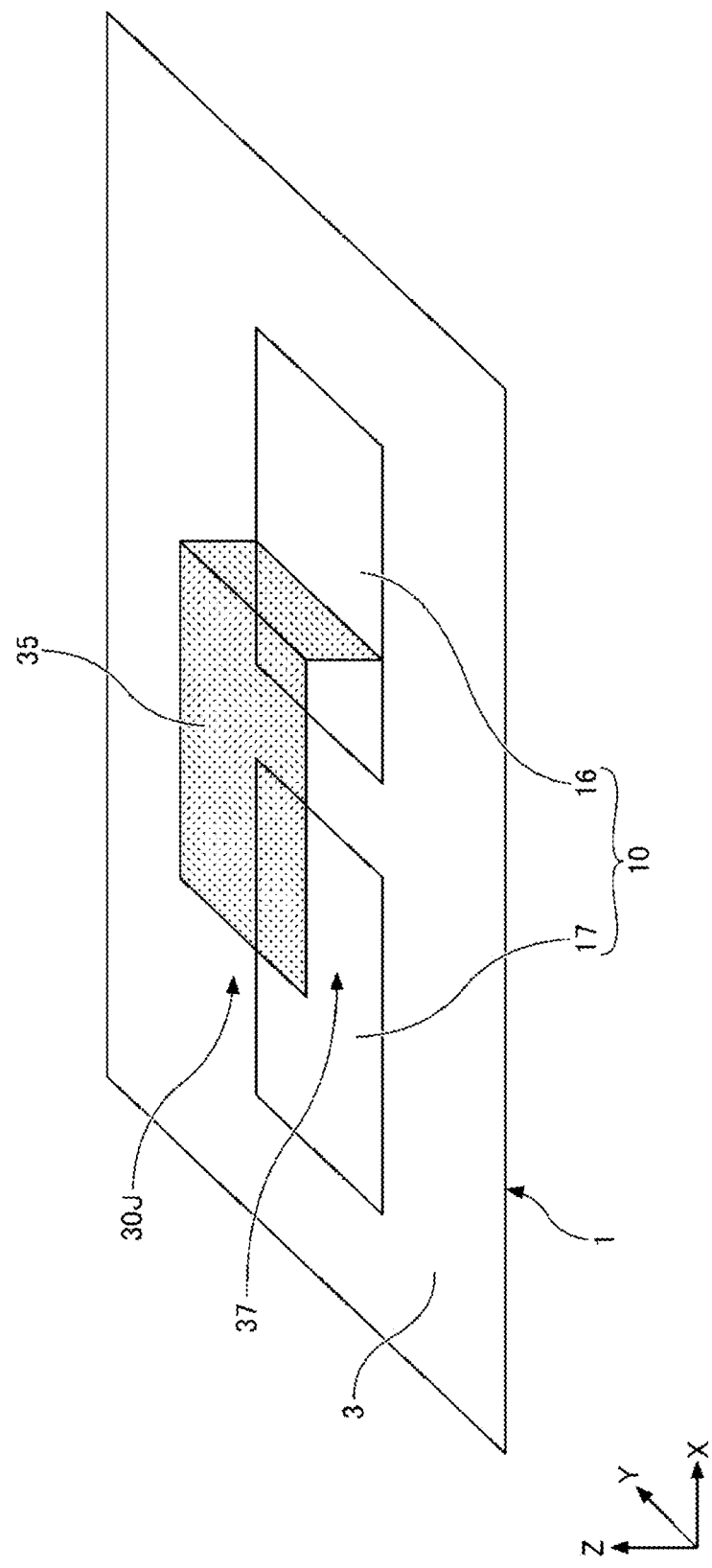
FIG. 12 is a perspective view illustrating a tenth example of the configuration of an electric circuit.

FIG. 12 is a perspective view illustrating a tenth example of the configuration of the electric circuit. In the tenth example of the configuration, description of the configuration, functions and effects similar to those of the above-described examples of the configuration is omitted by citing the above descriptions. In FIG. 12, as the electric circuit which attenuates the signal of the second frequency band, an electric circuit 30J is exemplified. The electric circuit 30J has a capacitive coupling formed by an extending conductor 35 and a gap 37 between the feeding portion 16 and the feeding portion 17.

The electric circuit 30J is provided between the feeding portion 16 and the feeding portion 17. In this example, the electric circuit 30J includes the extending conductor 35 electrically connected to the feeding portion 16, and the gap 37 interposed between the extending conductor 35 and the feeding portion 17. The gap 37 is an example of the dielectric layer and in this example, it is interposed in a direction perpendicular to the XY plane. The capacitive coupling is formed by the extending conductor 35 and the gap 37. By including the capacitive coupling formed by the extending conductor 35 and the gap 37, the electric circuit 30J attenuates the signal of the second frequency band.

The extending conductor 35 is a linear or planar conductor protruding to the positive side of the Z axis direction relative to the plane on which the antenna 10 is formed. The extending conductor 35 extends from the feeding portion 16 so as to form a gap 36 between the extending conductor 35 and the feeding portion 17. In the tenth example of the configuration of the electric circuit shown in FIG. 12, the extending conductor 35 is an L-shaped conductor, but may be a conductor having a shape other than L-shape.

Figure 13:
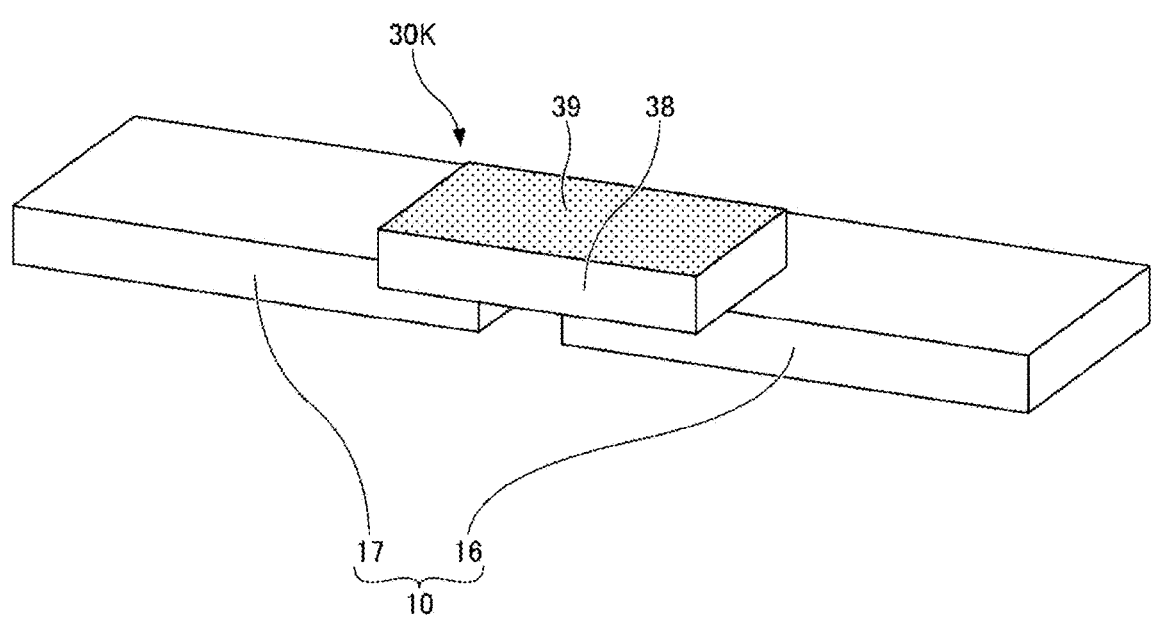
FIG. 13 is a perspective view illustrating an eleventh example of the configuration of an electric circuit.

FIG. 13 is a perspective view illustrating an eleventh example of the configuration of the electric circuit. In the eleventh example of the configuration, description of the configuration, functions and effects similar to those of the above-described examples of the configuration is omitted by citing the above descriptions. In FIG. 13, as the electric circuit which attenuates the signal of the second frequency band, an electric circuit 30K is exemplified. The electric circuit 30K has a capacitive coupling formed by a conductor layer 39 and a dielectric layer 38 between the feeding portion 16 and the feeding portion 17.

The electric circuit 30K is provided between the feeding portion 16 and the feeding portion 17. In this example, the electric circuit 30K has the dielectric layer 38 and the conductor layer 39, the conductor layer 39 is electrically connected to the feeding portion 16 by the dielectric layer 38, and the dielectric layer 38 is interposed between the conductor layer 39 and the feeding portion 17. A capacitive coupling is formed by the conductive layer 39 and the dielectric layer 38. By including the capacitive coupling formed by the conductor layer 39 and the dielectric layer 38, the electric circuit 30K attenuates the signal of the second frequency band.

The dielectric layer 38 has a first surface in contact with at least a part of the surface of the feeding portion 16 and at least a part of the surface of the feeding portion 17, and a second surface on the opposite side from the first surface. The conductor layer 39 is formed on the second surface. The capacitive coupling between the feeding portion 16 and the feeding portion 17 is formed by a laminate of the dielectric layer 38 and the conductor layer 39.

Figure 14:
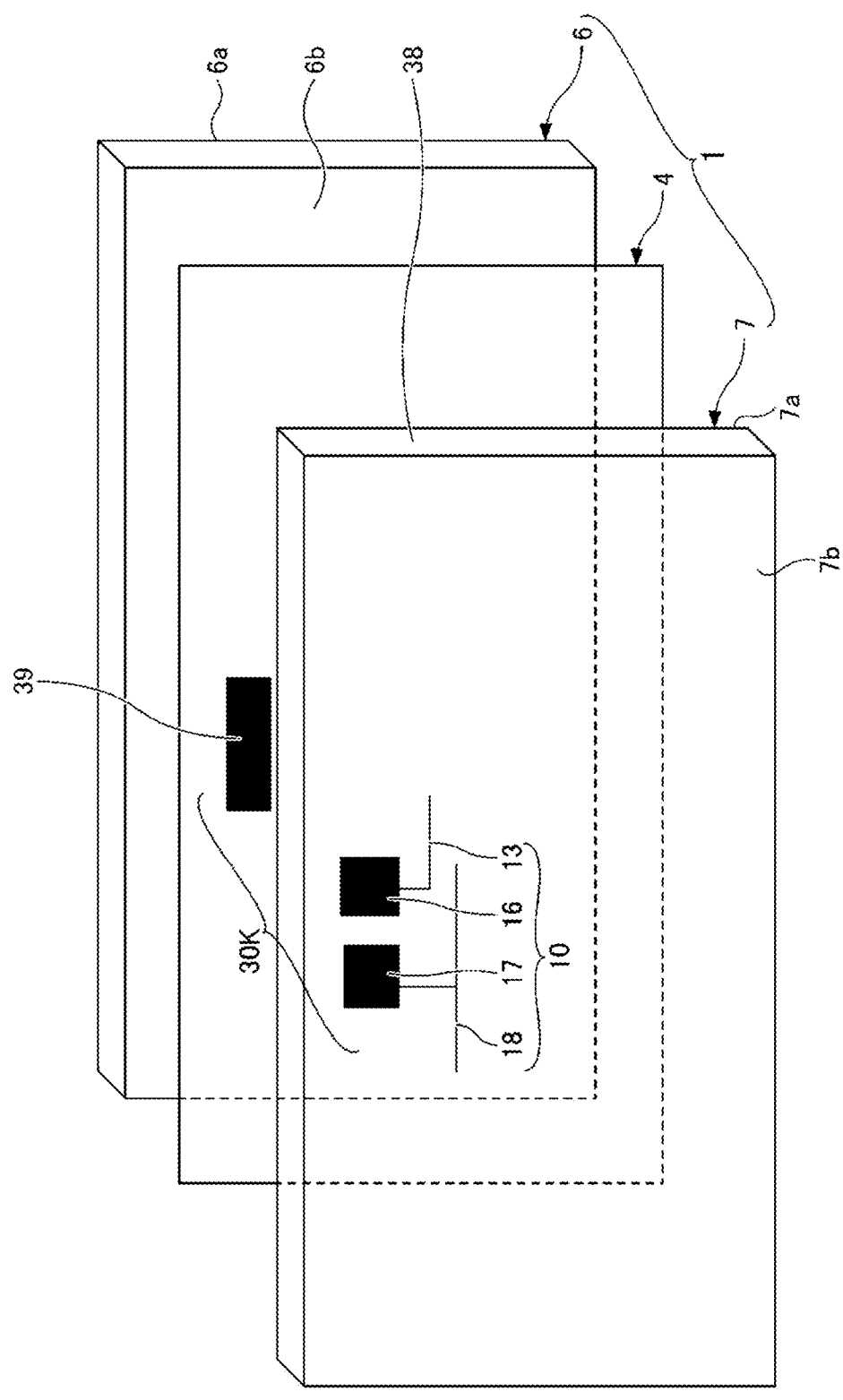
FIG. 14 is an exploded perspective view illustrating a specific example of the structure of the electric circuit according to the eleventh example of the configuration shown in FIG. 13.

FIG. 14 is an exploded perspective view illustrating a specific example of the configuration of the electric circuit according to the eleventh example of the configuration shown in FIG. 13. In this example, the conductor layer 39 is disposed between the interlayer 4 and the glass plate 7, and the dielectric layer 38 is realized by the glass plate 7. In this case, the feeding portion 16 and the feeding portion 17 may be disposed on the main surface 7b of the glass plate 7, and the conductor layer 39 may be disposed on the main surface 7a of the glass plate 7. The conductor layer 39 may be disposed between the interlayer 4 and the glass plate 6, or in the interlayer 4 composed of a plurality of layers laminated. In such a case, the dielectric layer 38 is realized by the glass plate 7 and the interlayer 4, and the conductor layer 39 may be disposed on the main surface 6b of the glass plate 6.

Now, results of measurement of antenna characteristics of the antenna device 100 using an actual window glass 1 will be described.

Figure 15:
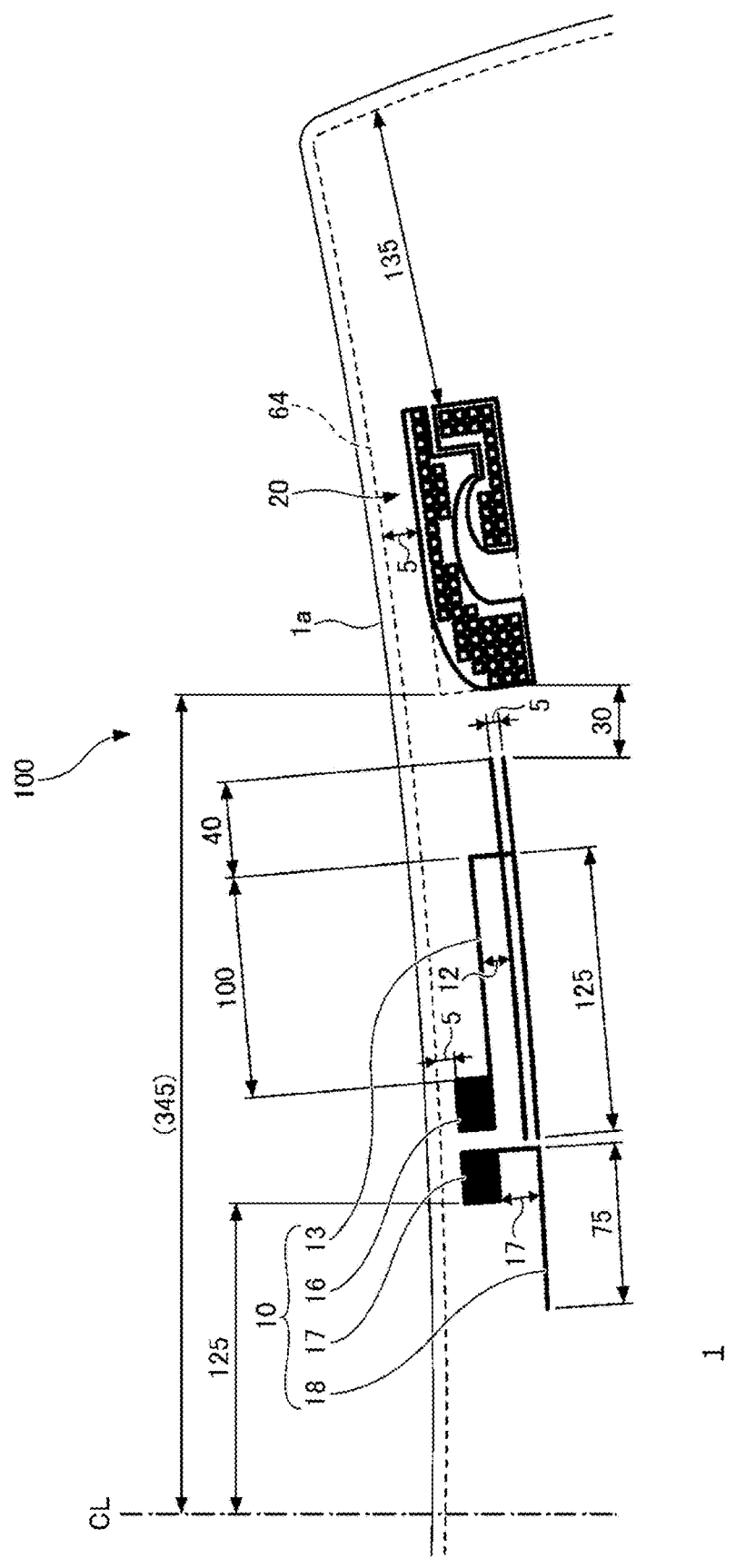
FIG. 15 is a view illustrating a basic structure of a vehicle antenna device at the time of measurement of the antenna characteristics.

FIG. 15 is a diagram illustrating a basic structure of a vehicle antenna device at the time of measurement of the antenna characteristics. The antenna 10 and the antenna 20 are provided on a glass surface on one side of a center line CL of the window glass 1. The unit of numerical values indicating the dimensions on the dimension line is mm.

The conditions for measurement of the antenna characteristics were as follows.

Distance D between the antenna 10 and the antenna 20: 30 mm

Window glass 1: windshield

Figure 16:
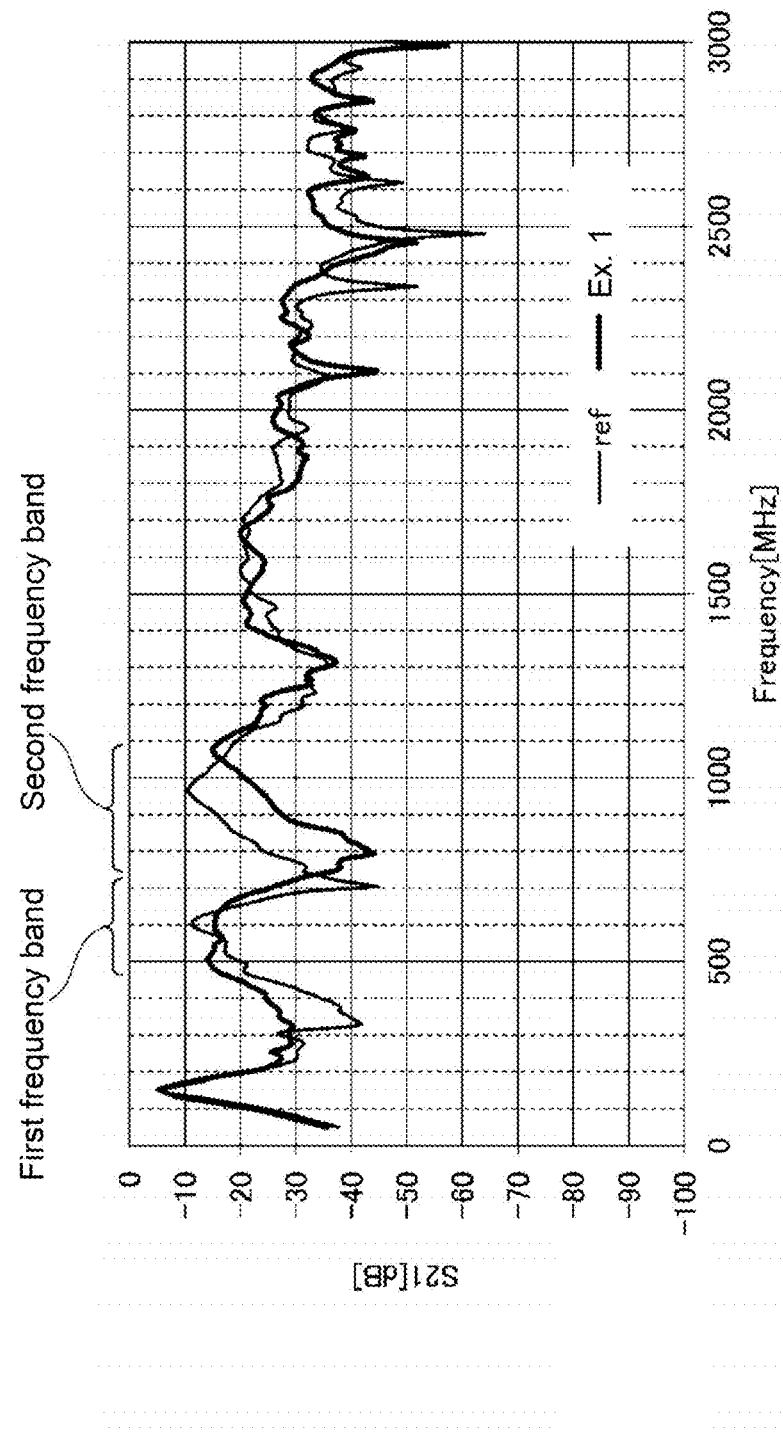
FIG. 16 is a graph illustrating a first example of the results of measurement of the transmission coefficient S21 of a vehicle antenna device.

Antenna 10: digital terrestrial television broadcasting antennas supporting 470 MHz to 710 MHz Antenna 20: communication antenna supporting sub6 of 6 GHz or less FIG. 16 is a graph illustrating a first example of the results of measurement of the transmission coefficient S21 of the vehicle antenna device. The transmission coefficient S21 represents the degree of transmission of radio-frequency signal from the feeding portion of the antenna 20 to the feeding portion 16 of the antenna 10, and the lower the coefficient, the hither the degree of isolation between the antenna and the antenna 20.

The graph represented by the reference "ref" indicates the results of measurement of the transmission coefficient S21 of the antenna device having the basic structure shown in FIG. 15. The graph represented by "Ex. 1" indicates the results of measurement of the transmission coefficient S21 of the antenna device comprising the electric circuit 30D according to the fourth example of the configuration shown in FIGS. 5 and 6, specifically, the results of measurement in an embodiment having the extending conductor 31 shown in FIGS. 5 and 6 added to the basic structure shown in FIG. 15.

As evident from FIG. 16, by providing the extending conductor 31 forming the capacitive coupling with the metal portion 63, the isolation between the antenna 10 and the antenna 20 was secured in the low frequency range of the second frequency band, as compared with a case where no extending conductor 31 was provided. Thus, in a state where the antenna 10 and the antenna 20 are placed proximate to each other, an unnecessary signal corresponding to the noise containing components of the second frequency band included in the antenna 10 attenuated.

Conditions of the extending conductor 31 were as follows:
Length of the conductor portion 31a: 8 mm,
Length of the conductor portion 31b: 60 mm
Width of the conductor portion 31a, 31b: 5 mm FIG. 17 is a graph illustrating the second example of the results of measurement of the transmission coefficient S21 of the vehicle antenna device.

The graph represented by the reference "ref" indicates the results of measurement of the transmission coefficient S21 of the antenna device having the basic structure shown in FIG. 15. The graph represented by "Ex. 2" indicates the results of measurement of the transmission coefficient S21 of the antenna device comprising the electric circuit 30K according to the eleventh example of the configuration shown in FIG. 13, specifically, the results of measurement in an embodiment having the dielectric layer 38 and the conductor layer 39 shown in FIG. 13 added to the basic structure shown in FIG. 15.

Figure 17:
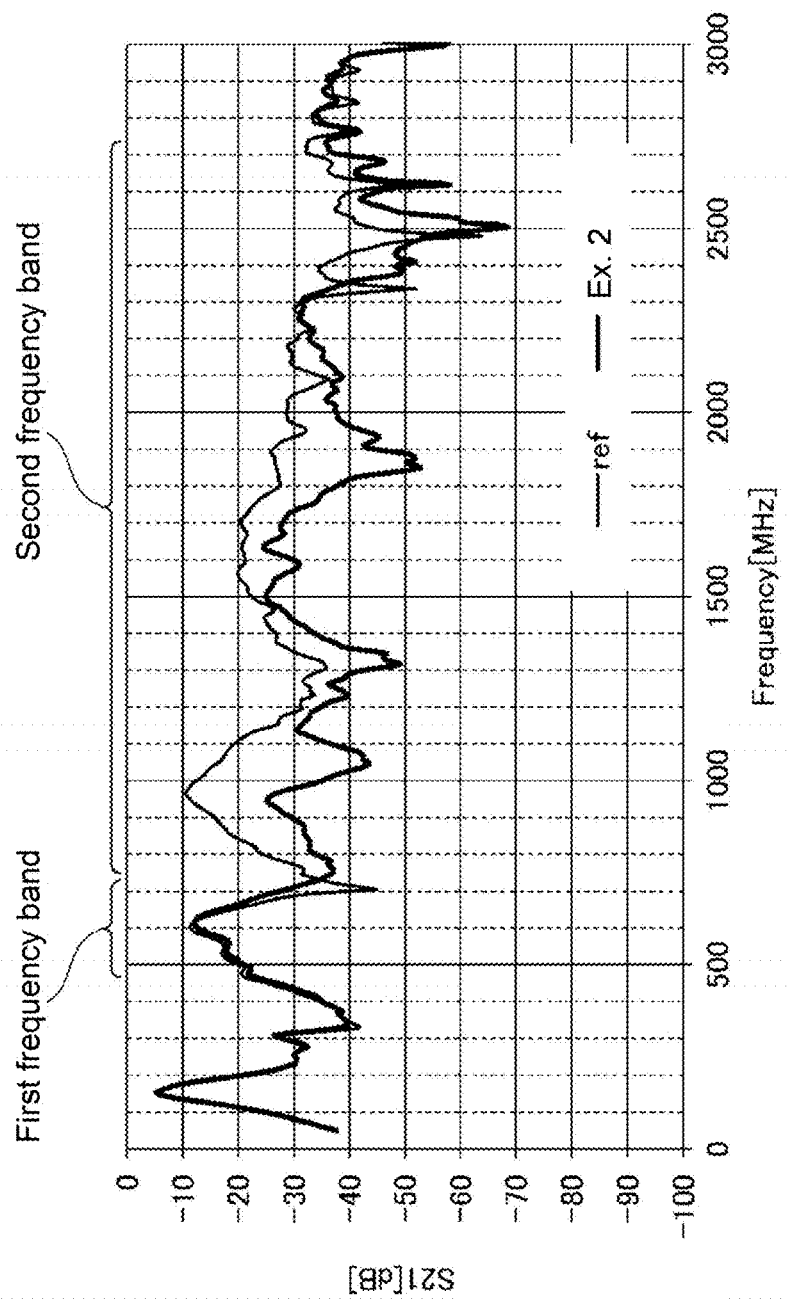
FIG. 17 is a graph illustrating a second example of the results of measurement of the transmission coefficient S21 of a vehicle antenna device.

As evident from FIG. 17, by the capacitive coupling being formed between the feeding portion 16 and the feeding portion 17, the isolation between the antenna 10 and the antenna 20 was secured in the low frequency range of the second frequency band, as compared with a case where no capacitive coupling was formed. Thus, in a state where the antenna 10 and the antenna 20 are placed proximate to each other, an unnecessary signal corresponding to the noise containing components of the second frequency band included in the antenna 10 was attenuated.

The conditions of the dielectric layer 38 and the conductor layer 39 were as follows:
The area where the dielectric layer 38 overlaps the feeding portions 16 and 17 in a plan view: 84 mm$^2$
The thickness of the dielectric layer 38: 0.06 mm
The dielectric layer 38: acetate.

The embodiment has been discussed above. However, the technology of the present disclosure is not limited to the above-described embodiment. Various modifications and improvements may be made. For example, the embodiment may be combined with or replaced by part of or the entirety of another embodiment.

For example, the glass plate for a vehicle is not limited to a window glass and may be another plate-shaped product such as a display panel.

The reference 20 not only means the antenna but also means an electronic device emitting radio waves of the second frequency band. For example, the in-vehicle system 200 shown in FIG. 1 comprises a vehicle antenna device (the window glass 1, the antenna 10 and the electric circuit 30), and an electronic device disposed separately from the antenna 10. The electric circuit 30 is provided at least one of between the feeding portion 16 or the vicinity of the feeding portion 16 and the ground portion, and between the feeding portion 16 and the above-described signal line of the transmission line. By the electric circuit 30 which attenuates the signal of the second frequency band being provided at such a portion, the isolation between the antenna 10 and the electronic device can be secured in the second frequency band. Thus, even when the antenna 10 and the electronic device are placed proximate to each other, the signal containing components of the second frequency band included in the antenna 10 can be attenuated. Specific examples of the electronic device include sensors, cameras, communication devices and lighting devices. The above descriptions relating to the antenna 20 may be cited to an embodiment in which the antenna 20 is replaced with the electronic device.

REFERENCE SYMBOLS

1: window glass
1a to 1d: glass edge
2, 3: main surface
4: interlayer
5: light shielding film
5a: inner edge
6,7: glass plate
6a, 6b, 7a, 7b: main surface
10: antenna
13: antenna element
16, 16A, 17: feeding portion
18: ground element
20: antenna
30, 30A to 30K: electric circuit
30a: capacitive coupling
30b: inductor
31, 34, 35: extending conductor
31a, 31b: conductor portion
32: conductor layer
36, 37: gap
38: dielectric layer
39: conductor layer
50: coaxial cable
51: inner conductor
52: outer conductor
60: ground portion
62: vehicle body
63: metal portion
64: inner edge
65: adhesive
66: window frame
100: antenna device
200: in-vehicle system

What is claimed is:
1. A vehicle antenna device comprising a glass plate for a vehicle, a first antenna capable of receiving or transmitting radio waves of a first frequency band, provided on the glass plate, and an electric circuit which attenuates a signal of a second frequency band including a frequency band higher than the first frequency band, wherein the first antenna has a first feeding portion to be electrically connected to a signal line of a transmission line and a first element connected to the first feeding portion, and the electric circuit is provided at least one of between the first feeding portion or the vicinity of the first feeding portion and a ground portion, and between the first feeding portion and the signal line.

2. The vehicle antenna device according to claim 1, wherein the electric circuit includes a capacitive coupling between the first feeding portion or the vicinity of the first feeding portion and the ground portion.

3. The vehicle antenna device according to claim 2, wherein the electric circuit includes a conductor electrically connected to the first feeding portion, and a dielectric layer interposed between the conductor and the ground portion.

4. The vehicle antenna device according to claim 3, wherein the dielectric layer includes glass.

5. The vehicle antenna device according to claim 4, wherein the glass plate has a first glass plate, a second glass plate which faces the first glass plate, and an interlayer provided between the first glass plate and the second glass plate, the first feeding portion is provided on a main surface of the second glass plate opposite from the interlayer, the dielectric layer includes the second glass plate, and the conductor is disposed between the first glass plate and the second glass plate.

6. The vehicle antenna device according to claim 4, wherein the glass plate has a first glass plate, a second glass plate which faces the first glass plate, and an interlayer provided between the first glass plate and the second glass plate, the first feeding portion is disposed between the first glass plate and the second glass plate, the conductor is disposed on a main surface of the second glass plate opposite from the interlayer, and the dielectric layer is positioned between the main surface and the ground portion.

7. The vehicle antenna device according to claim 3, wherein the conductor is an extending conductor extending from the first feeding portion or the vicinity of the first feeding portion.

8. The vehicle antenna device according to claim 1, wherein the ground portion includes a metal portion on a vehicle side.

9. The vehicle antenna device according to claim 1, wherein the first antenna has a second feeding portion to be electrically connected to a ground conductor of the transmission line, and the ground portion includes the second feeding portion.

10. The vehicle antenna device according to claim 9, wherein the first antenna has a second element to be electrically connected to the second feeding portion.

11. The vehicle antenna device according to claim 1, wherein the second frequency band is 617 MHz and higher.

12. The vehicle antenna device according to claim 11, wherein the second frequency band includes a 2.4 GHz band.

13. The vehicle antenna device according to claim 11, wherein the second frequency band includes at least one of a 5.2 GHz band, a 5.3 GHZ band, and a 5.6 GHz band.

14. The vehicle antenna device according to claim 1, wherein the electric circuit decreases at least part of receiving power of the second frequency band by 3 dB or more as compared with a case where no electric circuit is provided.

15. The vehicle antenna device according to claim 1, wherein the first frequency band incudes a frequency band included in VHF band or UHF band.

16. The vehicle antenna device according to claim 1, which has a second antenna capable of transmitting or receiving radio waves of the second frequency band, provided on the glass plate.

17. An in-vehicle system comprising the vehicle antenna device as defined in claim 1, and an electronic device disposed separately from the first antenna, wherein the electronic device emits electromagnetic waves of the second frequency band.

18. The in-vehicle system according to claim 17, wherein the distance between the first antenna and the electronic device is 100 mm or less.

19. The in-vehicle system according to claim 17, wherein the electronic device is provided on the glass plate.

* * * * *